United States Patent
Sunkada Gopinath et al.

(10) Patent No.: US 12,120,033 B2
(45) Date of Patent: Oct. 15, 2024

(54) METHOD AND APPARATUS FOR MANAGING THE FLOW OF DATA IN PDCP

(71) Applicant: SAMSUNG ELECTRONICS CO., LTD., Suwon-si (KR)

(72) Inventors: Srihari Das Sunkada Gopinath, Karnataka (IN); Aneesh Narendra Deshmukh, Karnataka (IN); Nayan Ostwal, Karnataka (IN); Gopinath Reddy Sadhu, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/897,832

(22) Filed: Aug. 29, 2022

(65) Prior Publication Data
US 2023/0412514 A1    Dec. 21, 2023

(30) Foreign Application Priority Data
Jun. 16, 2022   (IN) .............................. 202241034475

(51) Int. Cl.
| H04L 47/2483 | (2022.01) |
| H04L 47/34 | (2022.01) |
| H04L 69/22 | (2022.01) |
| H04W 80/02 | (2009.01) |
| H04W 80/08 | (2009.01) |

(52) U.S. Cl.
CPC .......... *H04L 47/2483* (2013.01); *H04L 47/34* (2013.01); *H04L 69/22* (2013.01); *H04W 80/02* (2013.01); *H04W 80/08* (2013.01)

(58) Field of Classification Search
CPC ..... H04L 47/2483; H04L 47/34; H04L 69/22; H04W 80/02; H04W 80/08
See application file for complete search history.

(56) References Cited

U.S. PATENT DOCUMENTS

| 2017/0222943 A1* | 8/2017 | Yao ........................ H04L 47/624 |
| 2018/0098241 A1* | 4/2018 | Callard ................ H04W 80/06 |
| 2019/0044880 A1 | 2/2019 | Yi et al. |
| 2019/0313278 A1 | 10/2019 | Liu |
| 2020/0100324 A1* | 3/2020 | Wittberg ............... H04W 24/02 |
| 2020/0351214 A1* | 11/2020 | Jung ..................... H04W 28/06 |

FOREIGN PATENT DOCUMENTS

| WO | 2018/170833 | 9/2018 |
| WO | 2020/092357 | 5/2020 |

* cited by examiner

*Primary Examiner* — Mandish K Randhawa
(74) *Attorney, Agent, or Firm* — Nixon & Vanderhye P.C.

(57) ABSTRACT

A method for management of data flow at a receiver includes receiving, in a reordering window of a PDCP layer, a plurality of data packets each including header information, and determining, based on the header information, packet sequence numbers of the received data packets, flow IDs each associated with a corresponding data packet of the received data packets, and at least one packet flow sequence number of each of the flow IDs, determining, based on the determined flow IDs and the at least one packet flow sequence number of each of the determined flow IDs, a set of data packets of which associated packet flow sequence numbers are in order with respect to the flow IDs, and transferring the determined set of data packets to an upper layer based on determining that the reorder timer of the PDCP layer is running.

18 Claims, 17 Drawing Sheets

METHOD AND APPARATUS FOR MANAGING THE FLOW OF DATA IN PDCP

CROSS REFERENCE TO RELATED APPLICATION

This application is based on and claims priority under 35 U.S.C. § 119(a) to Indian Complete Patent Application Serial No. 202241034475 (CS), filed on Jun. 16, 2022, in the Indian Intellectual Property Office, the disclosure of which is incorporated herein by reference in its entirety.

FIELD

Certain example embodiments relate to the field of wireless communication. In particular, a method and/or system for handling multiple flows in a single Data Radio Bearer (DRB) at Packet Data Convergence Protocol (PDCP) layer to avoid or reduce the likelihood of impact of packet loss in a single flow on all the flows in the DRB and causing lower TP issues due to transport layer packet recovery mechanisms.

BACKGROUND

Mobile phone usage has grown exponentially over the years since the advent of 4G and 5G. The Increased use of multiple mobile apps, various applications, and services has increased a huge load in the user experience and the network protocols. With the increased usage of available services and applications, a single user will tend to have multiple streams of IP flow and applications supported over a single PDU session.

Applications of similar QoS requirements will get mapped to a single DRB over the RAN. RAN manages the data at the DRB level and doesn't know that there are multiple independent flows within a DRB. With in-sequence delivery of the packets to the upper layers, packets that are received will likely get buffered at one or many of the protocol layers stacked at the modem.

In particular, the Radio Access Network (RAN) manages the data at the DRB level and is not aware that there are multiple independent flows (IP Data streams) within the DRB. An example diagram illustrating the mapping of the multiple IP Flows to the single DRB (DRB mapping 100) is shown in FIG. 1 of the drawings as per an existing scenario. A single PDU session (Internet PDU session) can handle the entire internet traffic on a commercial device and only voice and IMS streams (IMS PDU) are shared via a separate PDU Session. Any packet loss in the single DRB Flow would delay the packet delivery for all the data streams within the DRB. This can lead to various error recovery mechanisms getting triggered for individual data streams, depending on the transport layer protocol or application layer handling.

Taking the data Plane module functionalities of the 5G NR into consideration, the SDAP layer maps multiple flows to a different or the same DRBs and the PDCP/RLC layer provides services to upper layers by managing the DRBs. Further, the MAC multiplexes data from all DRBs and sends the data over the physical (PHY) layer. FIG. 2A is a diagram showing a layer 2 structure 202 of the 5G NR with reference to the multiple protocol layers such as PHY, MAC, RLC, PDCP, and SDAP, in accordance with existing art. FIG. 2B is a diagram illustrating the mapping of the multiple IP flows (IP Flow 1 to IP flow 5, voice stream, video stream) to the different (DRB 1 through DRB 4) or the same DRBs using SDAP in accordance with the layer 2 structure 202 of 5G NR of FIG. 2A.

Taking the NR Data Plane into consideration, packets from different IP flows belonging to the same DRB or even the packets from different IP flows belonging to different DRBs can get mapped to the same MAC transport block. A mapping example of mapping the packets in the NR data plane is illustrated in FIG. 3 of the drawings, in accordance with existing art. The multiple transport blocks (TB) are transmitted one after another. Few of the TBs among the transmitted TBs can be recovered in some time while few take longer time to recover and may retransmission of TBs have longer recovery time (e.g., Transport block 2 that lost over the air as shown in FIG. 3) is required. Because of the retransmission, TBs are received at the receiver out of order. Further, packets need to be buffered until the retransmission of the missing TB is successful. Hence, Lost TBs lead to the missing packet at the PDCP Reorder window. PDCP receiver window maintains the reorder window and the T-reorder timer supports in-sequence delivery of the packets to the upper layer. 5G NR implements packet reordering at the PDCP layer. As per the NR PDCP specification, the PDCP layer supports the reordering and in-order delivery of packets. However, due to reordering support at PDCP, when out-of-order packets are received the reordering timer is triggered and the packets need to wait in the reordering window until the missing packets are received or the reorder timer expires.

Further, as an example, a diagram for illustrating the problem related to the waiting of packets in the reordering window is shown in FIG. 4, in accordance with existing art. FIG. 4 depicts the diagram representing the waiting of packets in the reordering window until the missing packets are received or the reorder timer expires when the reordering timer is triggered after the reception of the out-of-order packets. It is evident from FIG. 4 that packets with sequence numbers (SN 5, SN 6) are not delivered to the application even though they are in order with respect to the IP Flow 1 of the first Application because of the missing packets with PDCP sequence number (SN 3 and SN 4 of IP flow 2) from the reordering window. Buffers are not freed at PDCP. It may trigger the transport layer timeout at the sender application and may lead to a slow start and retransmission of the packets due to which the first application suffers because of the loss in packets of the second application belonging to the IP flow 2. In particular, each flow may belong to different Applications/Transport layer sessions at the user space. Therefore, INORDER Packets of the IP Flow 1 wait in the reordering window due to the out of order in another IP flow 2 as both the flows belong to the same DRB.

In view of the above-discussed scenarios and problems, it is very likely possible that data of a particular flow gets affected because of the above PDCP functionality as PDCP waits for packet recovery. When multiple IP streams get mapped to a single DRB entity, any packet loss can affect all the IP Data streams, though it is very likely that all the packets of that IP Data stream that are received in order but are buffered due to PDCP reordering. Applications using Transport control protocol (TCP) may go for flow control and RTT calculation may get impacted. The throughput of a flow may also get impacted even though there is no packet loss in that flow. Application using other Transport protocols may have their internal error recovery mechanisms depending on various factors like round trip time, Network Loss Functions, etc. Any packet loss can indirectly affect all the other streams.

Therefore, there lies a need for a method and/or system to manage the flow of the data in PDCP in such a way that the packet loss in a single data flow does not significantly affect other multiple data streams that are mapped to the single DRB.

SUMMARY

This summary is provided to introduce a selection of concepts in a simplified format that is further described in the detailed description. This summary is not intended for determining the scope of the invention.

In an example implementation, a method for management of data flow at a receiver may include receiving, in a reordering window of a Packet Data Convergence Protocol (PDCP) layer, a plurality of data packets each including header information. The method may further include determining, based on the header information, packet sequence numbers of the received plurality of data packets, a flow identifiers (IDs) each associated with a corresponding data packet of the received plurality of data packets, and at least one packet flow sequence number of each of the flow IDs. The method may further include determining whether a reorder timer of (e.g., for) the PDCP layer is running based on the packet sequence numbers of the received plurality of data packets, and thereafter determining, based on the determined flow IDs and the at least one packet flow sequence number of each of the determined flow IDs, a first set of data packets among the received plurality of data packets of which associated packet flow sequence numbers are in order with respect to the flow IDs. Subsequent to the determination of the first set of data packets, the method may further include transferring the determined first set of data packets to an upper layer based on determining that the reorder timer of (e.g., for) the PDCP layer is running.

In an example implementation, a method for management of data flow at a receiver in a communication network may include receiving, in a reordering window of a Packet Data Convergence Protocol (PDCP) layer, a plurality of data packets associated with a plurality of applications from a transmitter. The method may further include generating a flow IDs of the received plurality of data packets based on the application header information. Each of the generated flows IDs corresponds to a corresponding data packet of the received plurality of data packets. The method may further include determining, based on packet sequence numbers of the received plurality of data packets and the determined flow IDs, application flow sequence numbers of each of the generated flow IDs, and thereafter determining whether a reorder timer of the PDCP layer is running based on the packet sequence numbers of the received plurality of data packets. The method may further include determining, based on the generated flow IDs and the application flow sequence numbers of each of the generated flow IDs, a first set of data packets among the received plurality of data packets of which associated application flow sequence numbers are in sequence with respect to the flow IDs. Subsequent to the determination of the first set of data packets, the method may include transferring the determined first set of data packets to an upper layer based on determining that the reorder timer of the PDCP layer is running.

In an example implementation, a method for identifying and/or managing flow of data at a transmitter in a communication network may include receiving, in a Packet Data Convergence Protocol (PDCP) layer, a plurality of data packets in a bit sequence from an upper layer and thereafter analyzing a sequence flow of the plurality of data packets in the bit sequence based on packet sequence numbers included in a Packet Data Unit (PDU) header of each of the plurality of data packets received in the PDCP layer. The method may further include assigning a flow ID to each of the plurality of data packets based on a result of the analysis and a plurality of parameters related to each of the plurality of data packets, and adding a corresponding flow ID among the assigned flow IDs to the PDU header of a corresponding data packet of the plurality of data packets. The method may further include adding, in ascending order of the packet sequence numbers of the plurality of data packets, at least one packet flow sequence number in the PDU Header of the corresponding data packet of the plurality of data packets of the corresponding flow IDs. Subsequent to the addition of the at least one packet flow sequence number in the PDU Header of the corresponding data packet of the plurality of data packets, the method may include transferring, to a Radio link control (RLC) layer, the plurality of data packets after the addition of the assigned flow IDs and the addition of the at least one packet flow sequence number in the PDU Header of the corresponding data packet of the plurality of data packets of the corresponding flow IDs.

Certain example embodiments may relate to a receiver for management of data flow in a communication network. The receiver include a memory, and at least one processor coupled to the memory. The at least one processor may be configured to receive, in a reordering window of a Packet Data Convergence Protocol (PDCP) layer, a plurality of data packets each including header information from a transmitter. The at least one processor may further be configured to determine, based on the header information, packet sequence numbers of the received plurality of data packets, flow IDs each associated with each of a corresponding data packet of the received plurality of data packets, and at least one packet flow sequence number of each of the flow IDs. The at least one processor may further be configured to determine whether a reorder timer of the PDCP layer is running based on the packet sequence numbers of the received plurality of data packets, and thereafter configured to determine, based on the determined flow IDs and the at least one packet flow sequence number of each of the determined flow IDs, a first set of data packets among the received plurality of data packets of which associated packet flow sequence numbers are in order with respect to the flow IDs. After the determination of the first set of data packets, the at least one processor may further be configured to transfer the determined first set of data packets to an upper layer based on determining that the reorder timer of the PDCP layer is running.

Certain example embodiments may relate to a receiver for management of data flow in a communication network. The receiver includes a memory and at least one processor coupled to the memory. The at least one processor may be configured to receive, in a reordering window of a Packet Data Convergence Protocol (PDCP) layer, a plurality of data packets associated with a plurality of applications from a transmitter. Each of the received plurality of data packets includes application header information. The at least one processor may further be configured to generate flow IDs of the received plurality of data packets based on the application header information, each of the flows IDs corresponding to a corresponding data packet of the received plurality of data packets, and thereafter configured to determine, based on packet sequence numbers of the received plurality of data packets and the generated flow IDs, application flow sequence numbers of each of the flow IDs. The at least one processor may further be configured to determine whether a reorder timer of the PDCP layer is running based on the packet sequence numbers of the received plurality of data packets, and determine, based on the generated flow IDs and the application flow sequence numbers of each of the generated flow IDs, a first set of data packets among the received plurality of data packets of which associated application flow sequence numbers are in sequence with respect to the flow IDs. After the determination of the first set of data packets, the at least one processor may further be configured to transfer the determined first set of data packets to an upper layer based on determining that the reorder timer of the PDCP layer is running.

Certain example embodiments may relate to a communication system for management of data flow. The communication system may include a transmitter including at least one processor which may be configured to receive, in a Packet Data Convergence Protocol (PDCP) layer, a plurality of data packets in a bit sequence from an upper layer, and analyze a sequence flow of the plurality of data packets in the bit sequence based on packet sequence numbers included in a Packet Data Unit (PDU) header of each of the plurality of data packets received in the PDCP layer. The at least one processor may further be configured to assign a flow ID to each of the plurality of data packets based on a result of the analysis and a plurality of parameters related to each of the plurality of data packets, and add a corresponding flow ID among the assigned flow IDs to the PDU header of a corresponding data packet of the plurality of data packets. After the addition of the corresponding flow ID among the assigned flow IDs to the PDU header, the at least one processor may further be configured to add, in an ascending order of the packet sequence numbers of the plurality of data packets, at least one packet flow sequence number in the PDU Header of the corresponding data packet of the plurality of data packets of the corresponding flow IDs. Thereafter, the at least one processor may further be configured to transfer, to a Radio link control (RLC) layer, the plurality of data packets after the addition of the assigned flow IDs and the addition of the at least one packet flow sequence number in the PDU Header of the corresponding data packet of the plurality of data packets of the corresponding flow IDs.

To further clarify the advantages and/or features, a more particular description of certain example embodiments of the invention will be rendered by reference to specific embodiments thereof, which is illustrated in the appended drawing. It is appreciated that these drawings depict only typical example embodiments of the invention and are therefore not to be considered limiting its scope.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Figure 1:
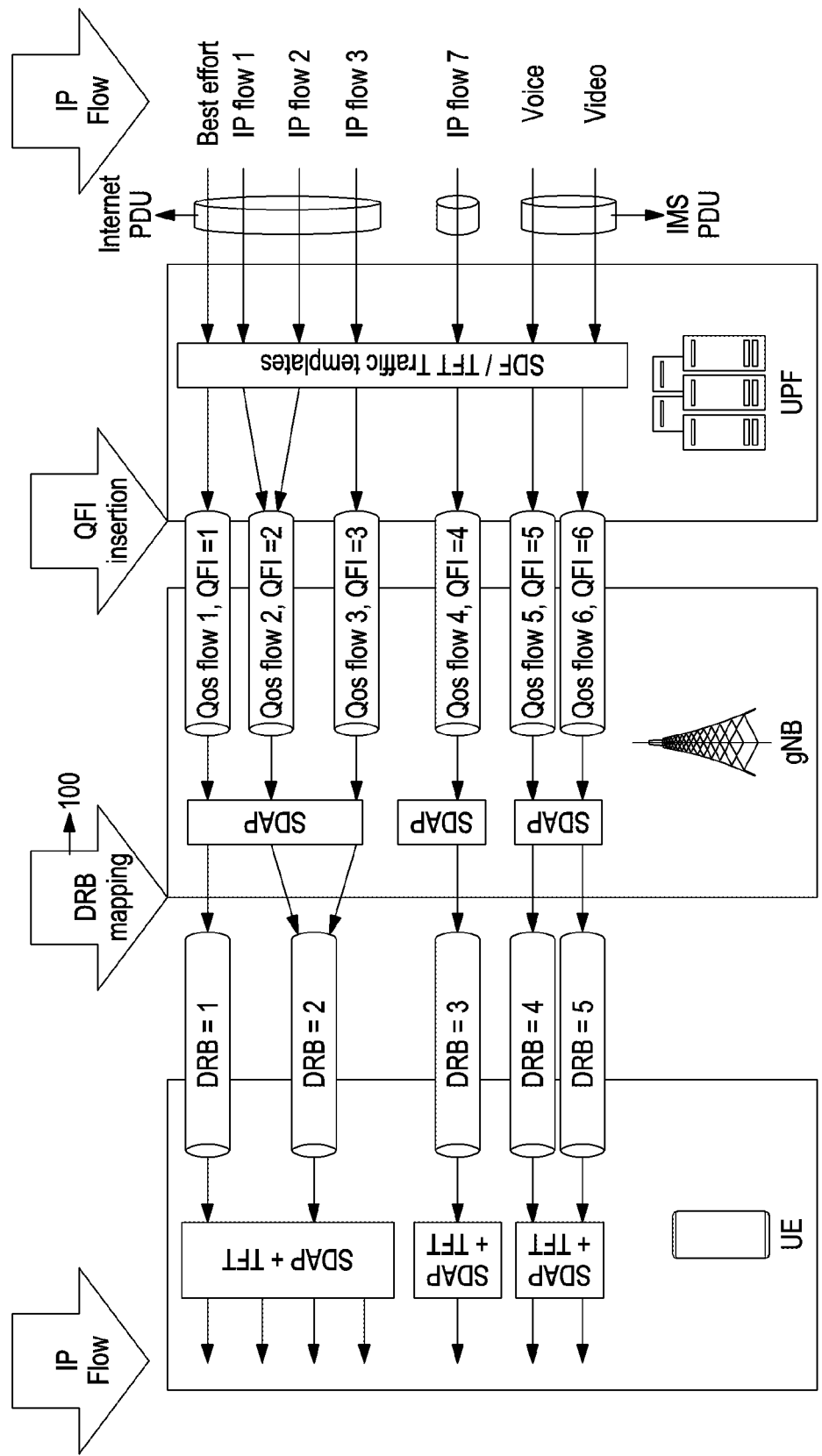
FIG. 1 is a diagram illustrating a mapping of the multiple IP Flows to a single DRB, in accordance with related art.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the example embodiments so as not to obscure the drawings with details that will be readily apparent to those of ordinary skill in the art having the benefit of the description herein.

DETAILED DESCRIPTION

It should be understood at the outset that although illustrative implementations of the example embodiments are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Example embodiments will be described below in detail with reference to the accompanying drawings.

Figure 5A:
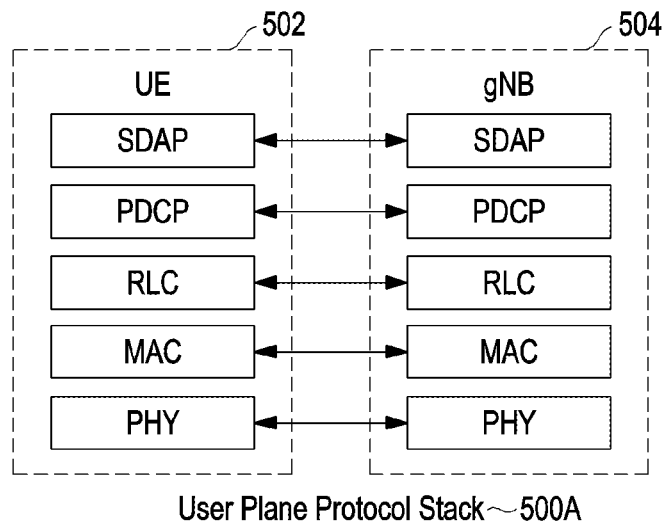
FIG. 5A and FIG. 5B are block diagrams illustrating a RAN protocol stack between a User Equipment (UE) and an NG Radio Access Network (NG-RAN e.g., gNB) based on the 3rd generation partnership project (3GPP) radio access network, respectively, in accordance with an example embodiment.
Figure 5B:
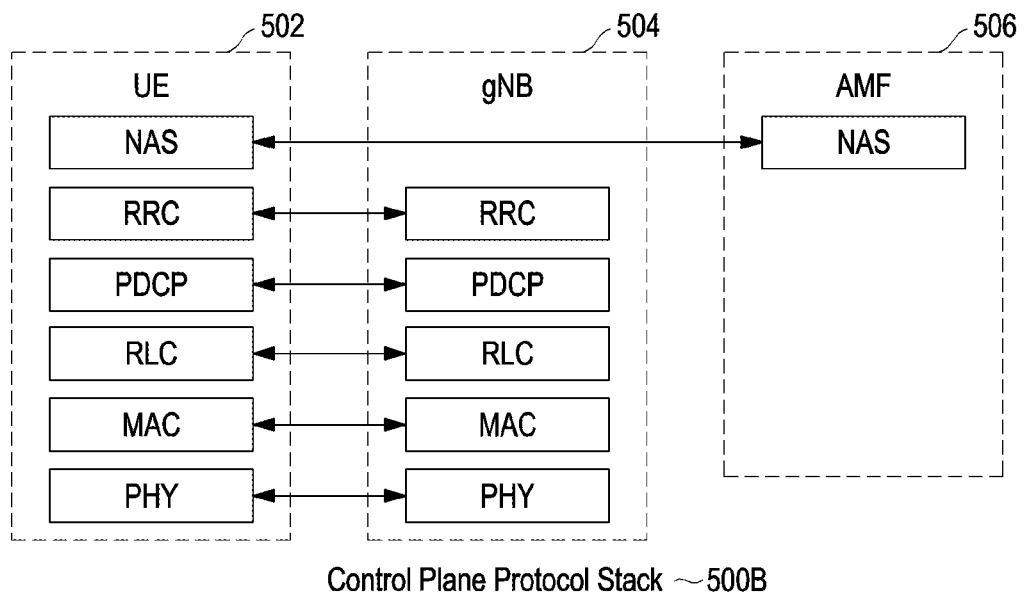

FIG. 5A and FIG. 5B are a diagram illustrating a RAN protocol stack between a User Equipment (UE) and an NG Radio Access Network (NG-RAN e.g., gNB) based on the 3rd generation partnership project (3GPP) radio access network, respectively, in accordance with an embodiment. FIG. 5A and FIG. 5B depict the UE 502, the gNB 504, and the AMF 506. The gNB 504 is connected to the AMF 506 by means of the NG control-plane part. One gNB 504 can be connected to multiple AMFs for load sharing and redundancy. The gNB 504 is connected to the UE 502 via a communication interface (Uu interface). For the UE 502 to communicate with the network (AMF 506 or UPF), the gNB 504 handles all the uplink as well as downlink transmissions. All data flows, user data as well as RRC signalling, are handled also handled by the gNB 504. Each of the UE 502 and the gNB 504 includes at least one processor for handling the uplink and downlink communications using the communication interface. Further, the at least one processor may control and manage the data flows required for the uplink and downlink communications with the network (AMF 506).

Figure 2A:
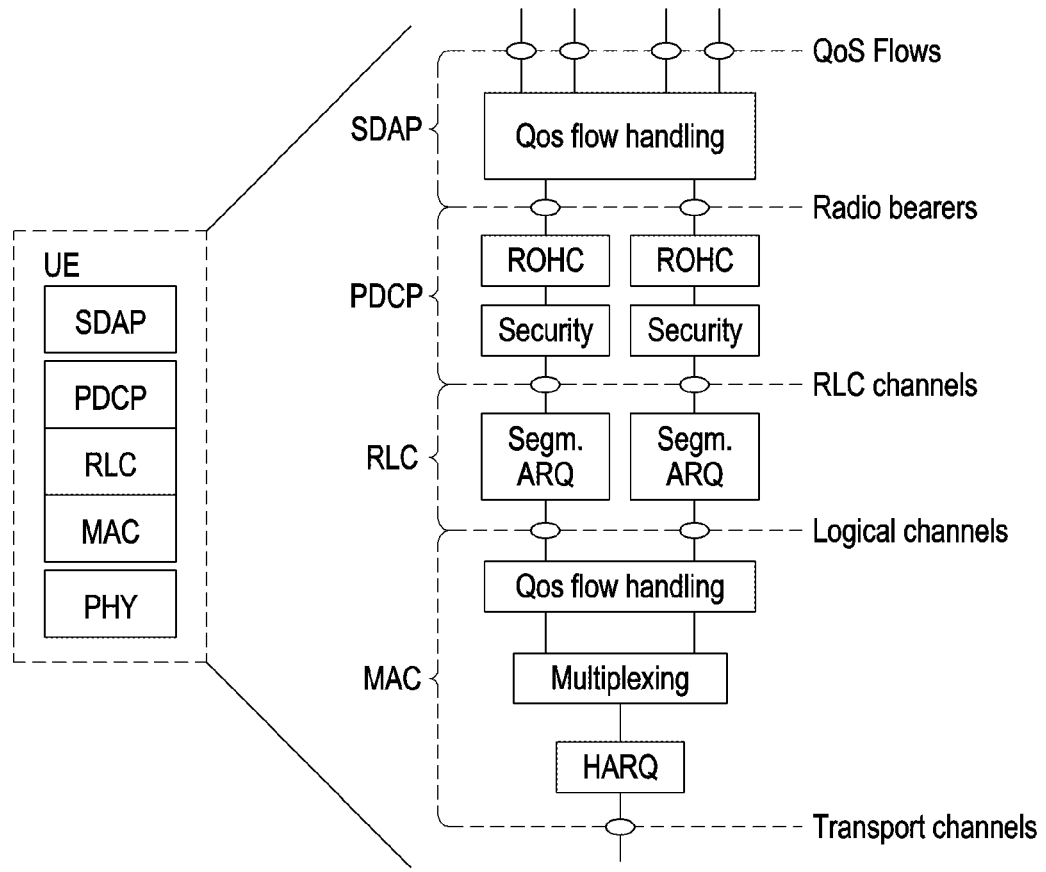
FIG. 2A is a diagram illustrating a layer 2 structure of the 5G NR with reference to the multiple protocol layers such as PHY, MAC, RLC, PDCP, SDAP, in accordance with related art.
Figure 2B:
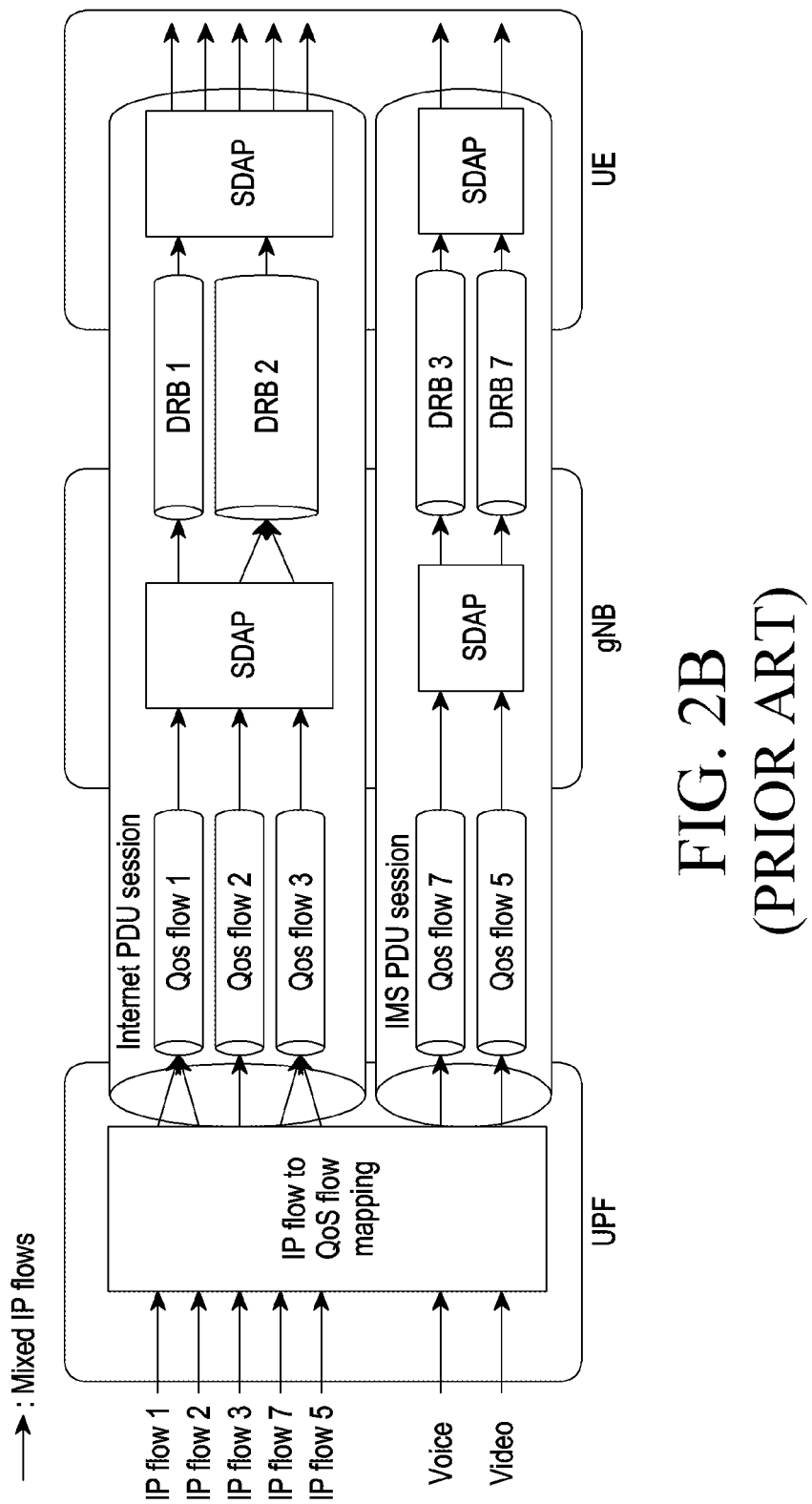
FIG. 2B is a diagram illustrating a mapping of the multiple IP flows to the different DRBs or the same DRBs using SDAP in accordance with the layer 2 structure of 5G NR of FIG. 2A, in accordance with related art.
Figure 3:
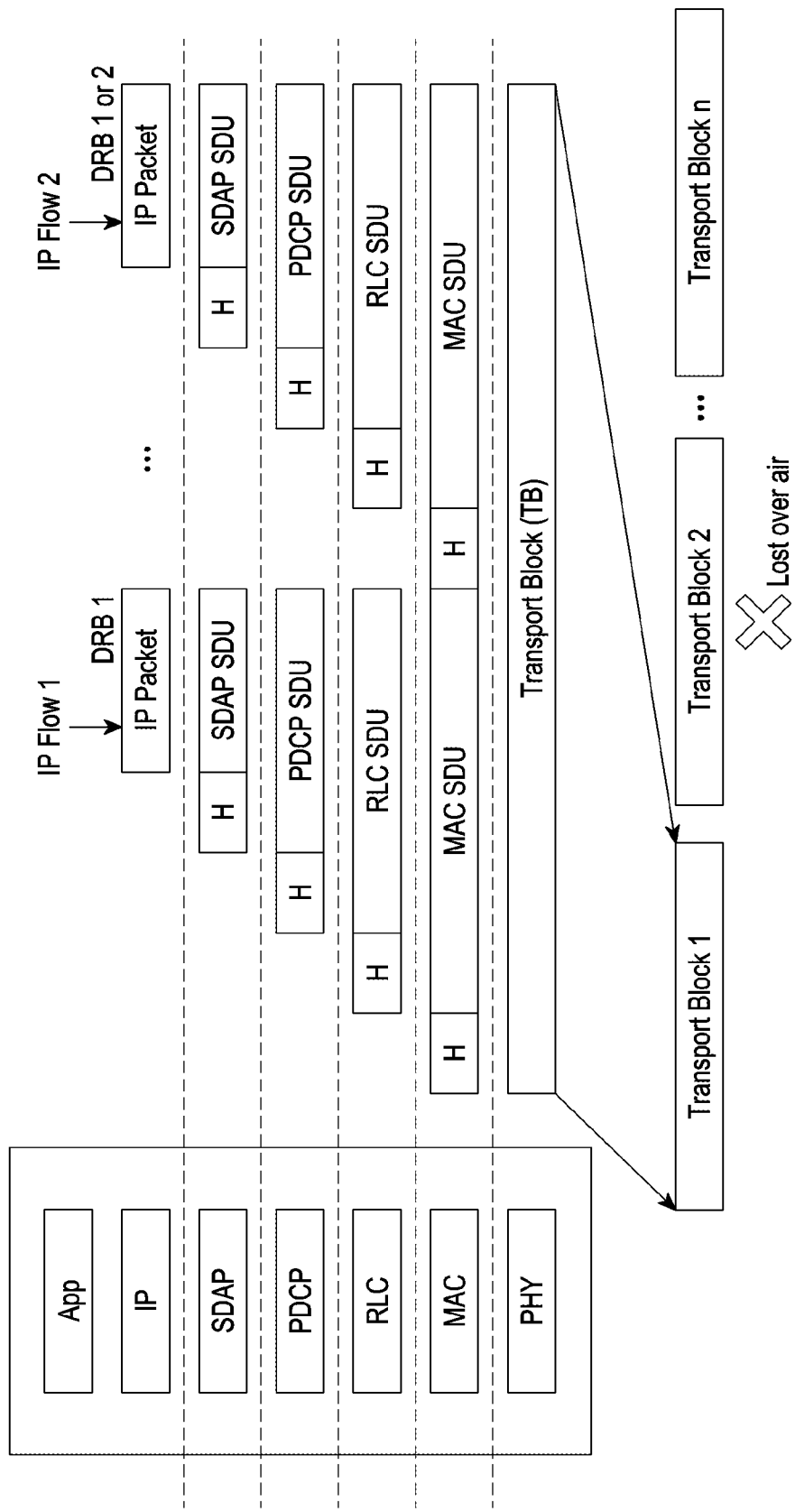
FIG. 3 is a diagram illustrating a mapping example of mapping the packets in the NR data plane, in accordance with related art.
Figure 4:
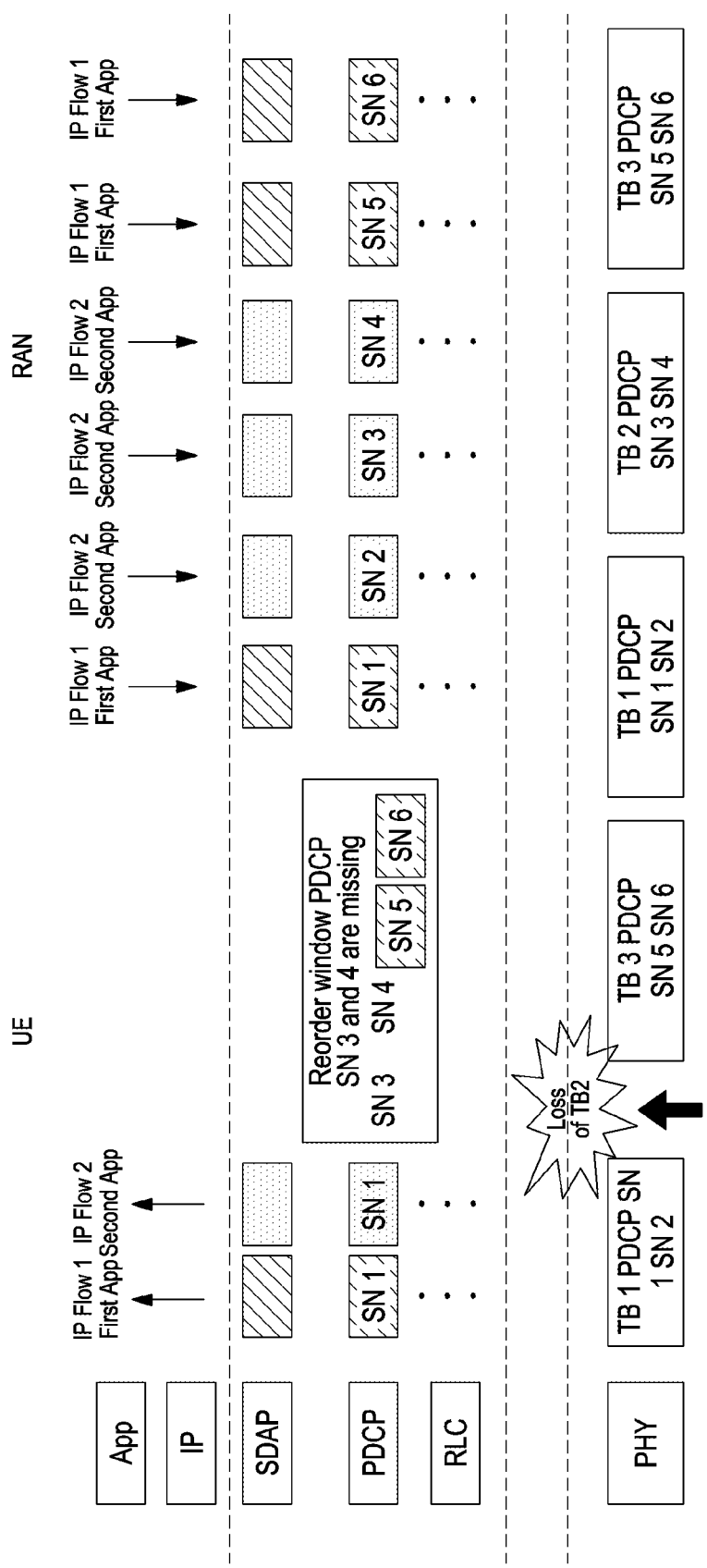
FIG. 4 is a diagram illustrating a problem related to the waiting of packets in the reordering window of the PDCP layer, in accordance with related art.

As shown in FIGS. 5A and 5B, there are two protocol stacks e.g., a user plane protocol stack 500A and a control plane protocol stack 500B including a plurality of layers for the wireless communication between the UE 502 and the gNB 504 or between the UE 502 and the network 506 via the gNB 504. The user plane refers to a path used for transmitting data generated in an application layer, e.g., voice data or Internet packet data. The control plane refers to a path used for transmitting control messages used for managing a call between the UE and the gNB. The layer 2 of 5G NR as shown in FIG. 2A includes a plurality of sub-layers for downlink and uplink communication. The plurality of sub-layer includes a physical layer, a Service Data Adaptation Protocol (SDAP) layer, a Packet Data Convergence Protocol (PDCP) layer, a Radio Link Control (RLC) layer, and a Medium Access Control (MAC) layer. The physical layer provides transport channels to the MAC sublayer. The MAC sub-layer provides logical channels to the RLC sublayer. The RLC sub-layer provides RLC channels to the PDCP sub-layer. The PDCP sub-layer provides radio bearers to the SDAP sublayer. The SDAP sub-layer further provides the radio bearers to 5GC QoS flows.

The main services and functions of the PDCP sublayer for the user plane include sequence numbering, header compression and decompression, transfer of user data, reordering and duplicate detection (if in-order delivery to layers above PDCP is required), retransmission of PDCP SDUs, PDCP re-establishment and data recovery for RLC AM, and duplication of PDCP PDUs, etc. The Reordering is taken care of in the PDCP sub-layer as per the Digital Radio Bearer (DRB) in the PDCP.

Further, one of the main services and functions of the PDCP sublayer for the control plane includes a sequence numbering of the packet data to be transmitted.

Any embodiment herein may be used in combination with any other embodiment described herein.

Figure 6:
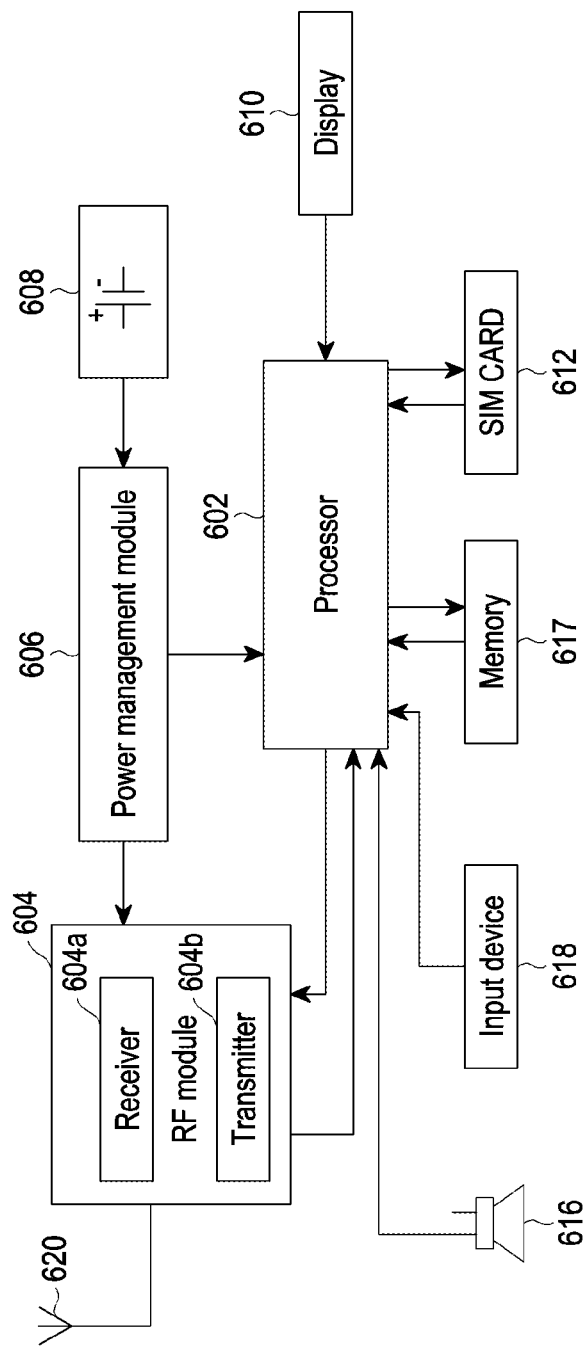
FIG. 6 is a block diagram of a communication system including a transmitter and a receiver, in accordance with an example embodiment.

Referring now to FIG. 6, is a block diagram of a communication system including a transmitter and a receiver, in accordance with an example embodiment. The communication system as shown in FIG. 6 may be implemented in the UE 502 and/or the gNB 504 of FIG. 5 and may be adapted to perform the method illustrated in FIGS. 7, 9, and 13, but it can be any system for performing the operations described below in flow charts of the FIGS. 7, 9, and 13.

As shown in FIG. 6, the communication system may include a processor 602 and an RF module (e.g., transceiver 604 including transceiving circuitry). The processor 602 (including processing circuitry) is electrically connected with the transceiver 604 and controls the transceiver 604. The communication system may further include an antenna 620 connected to the RF module (transceiver 604), a power management module 606, a battery 608, a display 610, a SIM card 612, a memory device 614, a speaker 616, and an input device 618, based on an example implementation. Each "module" herein may include circuitry, and each "processor" herein includes processing circuitry.

Specifically, the communication system of FIG. 6 when implemented in the UE 502, the communication system comprises a receiver 604A and the transmitter 604B constituting the transceiver 604. The communication system of FIG. 6 as the UE 502 comprises the processor 602 (including processing circuitry), where the processor 602 is connected to the transceiver (604: receiver 604A and transmitter 604B).

Also, the communication system of FIG. 6 when implemented in the gNB 504, the communication system comprising a transmitter 604B and a receiver 604A. The receiver 604A and the transmitter 604B constitute the transceiver 604, where the processor 602 is connected to the transceiver (604: receiver 604A and transmitter 604B).

Figure 7:
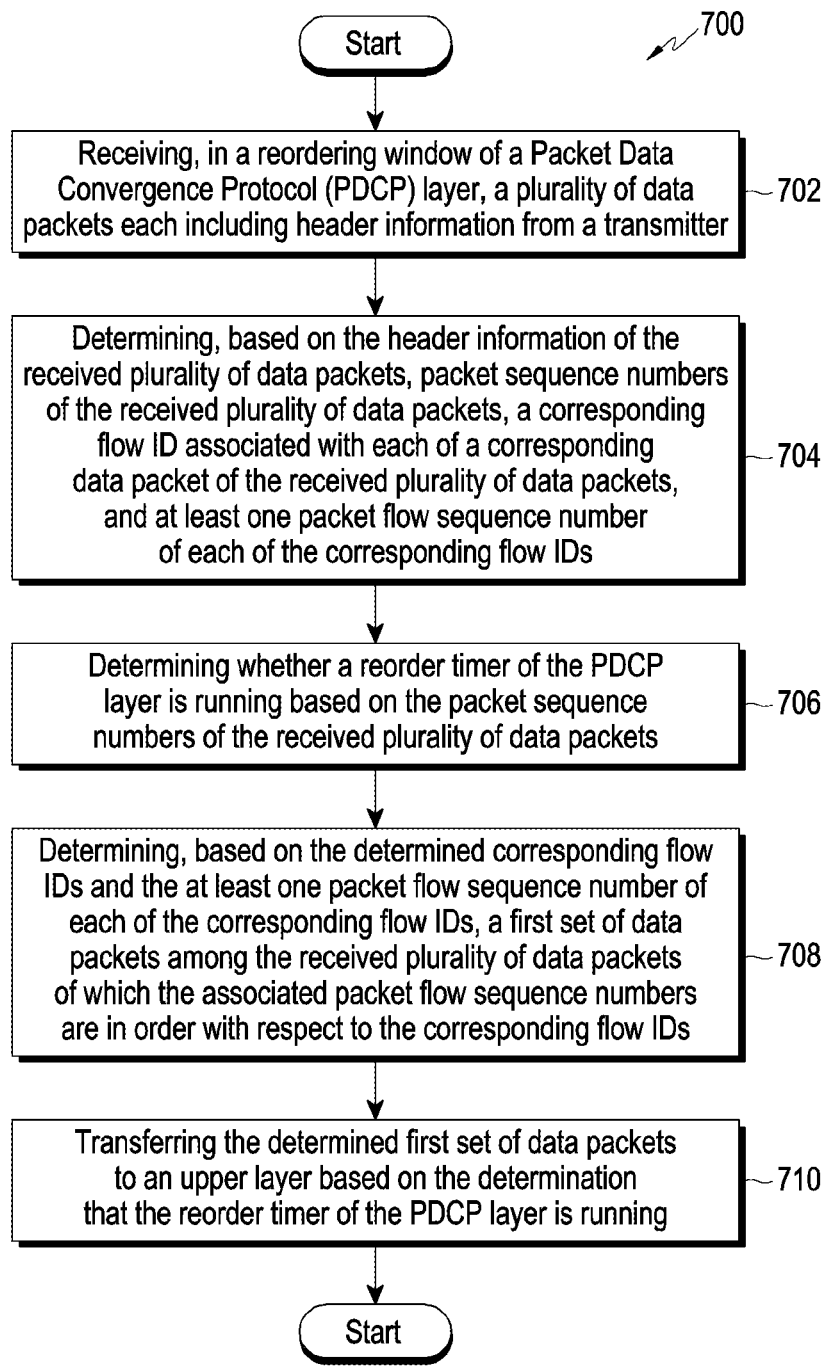
FIG. 7 is a flow chart of method steps for management of data flow at a receiver, in accordance with an example embodiment.

Now, a flow chart of method steps will be described with reference to FIG. 7 of the Drawings. FIG. 7 is a flow chart of method steps for management of data flow at the receiver 604A, in accordance with an example embodiment.

The method 700 comprises receiving (at step 702), in a reordering window of the PDCP layer, a plurality of data packets each including header information from a transmitter corresponding to the gNB 504 or the network. As an example, the processor 602 receives multiple data packets in the reordering window of the PDCP layer via the receiver 604A. Each of the received data packets includes header information. The header information corresponds to information included in a Packet Data Unit (PDU) header and one of a Service Data Adaptation Protocol (SDAP) header or a PDCP header of each of the corresponding data packet of the received data packets. The information included in the PDU header indicates the corresponding flow identifier (ID) of each of the corresponding data packet of the received data packets. The information included in one of the SDAP header or the PDCP header indicates the packet flow sequence numbers of each of the corresponding flow IDs.

According to an embodiment, the processor 602 may also receive, in the reordering window of the PDCP layer, data packets that are associated with multiple applications from the transmitter corresponding to the gNB 504 or the network, wherein each of the data packets that are associated with the multiple applications includes application header information. The application header information of the data packets that are associated with the multiple applications corresponds to transport protocol information present in the packet data. The flow of the method 700 now proceeds to (step 704).

At step 704, the method 700 further comprises determining, based on the header information of the received data packets, packet sequence numbers of the received data packets, a corresponding flow ID associated with each of a corresponding data packet of the received data packets, and at least one packet flow sequence number of each of the corresponding flow IDs. As an example, the processor 602 determines a corresponding packet sequence number of each of the received data packets, the packet flow sequence number of each of the corresponding flow IDs, and the at least one packet flow sequence number of each of the corresponding flow IDs using the information included in the PDU header and one of the SDAP header or the PDCP header of each of the corresponding data packet of the received data packets.

According to an embodiment, the processor 602 may also generate a corresponding flow ID of a corresponding data packet of the received data packets based on the application header information of the received data packets that are associated with the multiple applications. In particular, the processor 602 (including processing circuitry) generates the corresponding flow IDs using the transport protocol information present in the packet data. Thereafter, the processor 602 determines, based on packet sequence numbers of the received data packets and the generated corresponding flow IDs, the application flow sequence numbers of each of the corresponding flow IDs. The flow of the method 700 now proceeds to (step 706).

At step 706, the method 700 comprises determining whether a reorder timer of (e.g., for) the PDCP layer is running based on the packet sequence numbers of the received plurality of data packets. As an example, the processor 602 determines whether the reorder timer of the PDCP layer is running based on the packet sequence numbers of the received data packets. In particular, the processor 602 at first identifies at least one data packet in the received data packets whose packet sequence number is out of order based on a packet flow sequence number of a flow which is identified using flow ID, and thereafter determines that the reorder timer of the PDCP layer is running based on the identification of the at least one data packet whose at least one packet sequence number is out of order.

According to an embodiment, for determining whether the reorder timer of the PDCP layer is running the processor 602 may also identify, based on an application flow sequence number of a flow which is identified using the corresponding flow IDs that are generated and the application flow sequence numbers of each of the generated corresponding flow IDs, at least one data packet in the received data packets whose packet sequence numbers are out of order. Thereafter, the processor 602 may also determine that the reorder timer of the PDCP layer is running based on the identification of the at least one data packet whose packet sequence numbers are out of order. The flow of the method 700 now proceeds to (step 708).

At step 708, the method 700 comprises determining, based on the corresponding flow IDs and the at least one packet flow sequence number of each of the corresponding flow IDs, a first set of data packets among the received data packets of which the associated packet flow sequence numbers are in order with respect to the corresponding Flow IDs. As an example, the processor 602 determines those data packets among the received data packets of which the associated packet flow sequence numbers are in order with respect to the corresponding Flow IDs.

According to an embodiment, the processor 602 may also determine those data packets among the received data packets of which the associated application flow sequence numbers are in sequence with respect to the corresponding flow IDs. This determination is based on the corresponding flow IDs and the application flow sequence numbers of each of the corresponding flow IDs. The flow of the method 700 now proceeds to (step 710). It is noted that "based on" as used herein includes based at least on.

At step 710, subsequent to the determination of the data packets of which the associated application flow sequence numbers are in sequence with respect to the corresponding flow IDs, the method 700 comprises transferring the determined data packets that are in sequence with respect to the corresponding flow IDs to an upper layer in the RAN protocol stack. The determined data packets are transferred by the processor 602 based on the determination that the reorder timer of the PDCP layer is running. In particular, the processor 602 transfers, to the upper layer when the reorder timer of the PDCP layer is running, each of the data packets that are in sequence with respect to the corresponding Flow IDs. Also, the processor 602 keeps updating, when the reorder timer of the PDCP layer is running, packet flow sequence numbers of the corresponding flow IDs each time when the data packets are transferred from the PDCP layer to the upper layer. Here, the updated packet flow sequence number is the highest packet flow sequence number among packet flow sequence numbers of the data packets of the corresponding flow IDs that are previously transferred from the PDCP layer to the upper layer.

According to an embodiment, when the reorder timer of the PDCP layer is running, the processor 602 keeps updating the application flow sequence numbers of the corresponding flow IDs each time when the data packets are transferred from the PDCP layer to the upper layer. Here, the updated application flow sequence number is the highest application flow sequence number among application flow sequence numbers of the corresponding flow IDs that are previously transferred from the PDCP layer to the upper layer.

Figure 8:
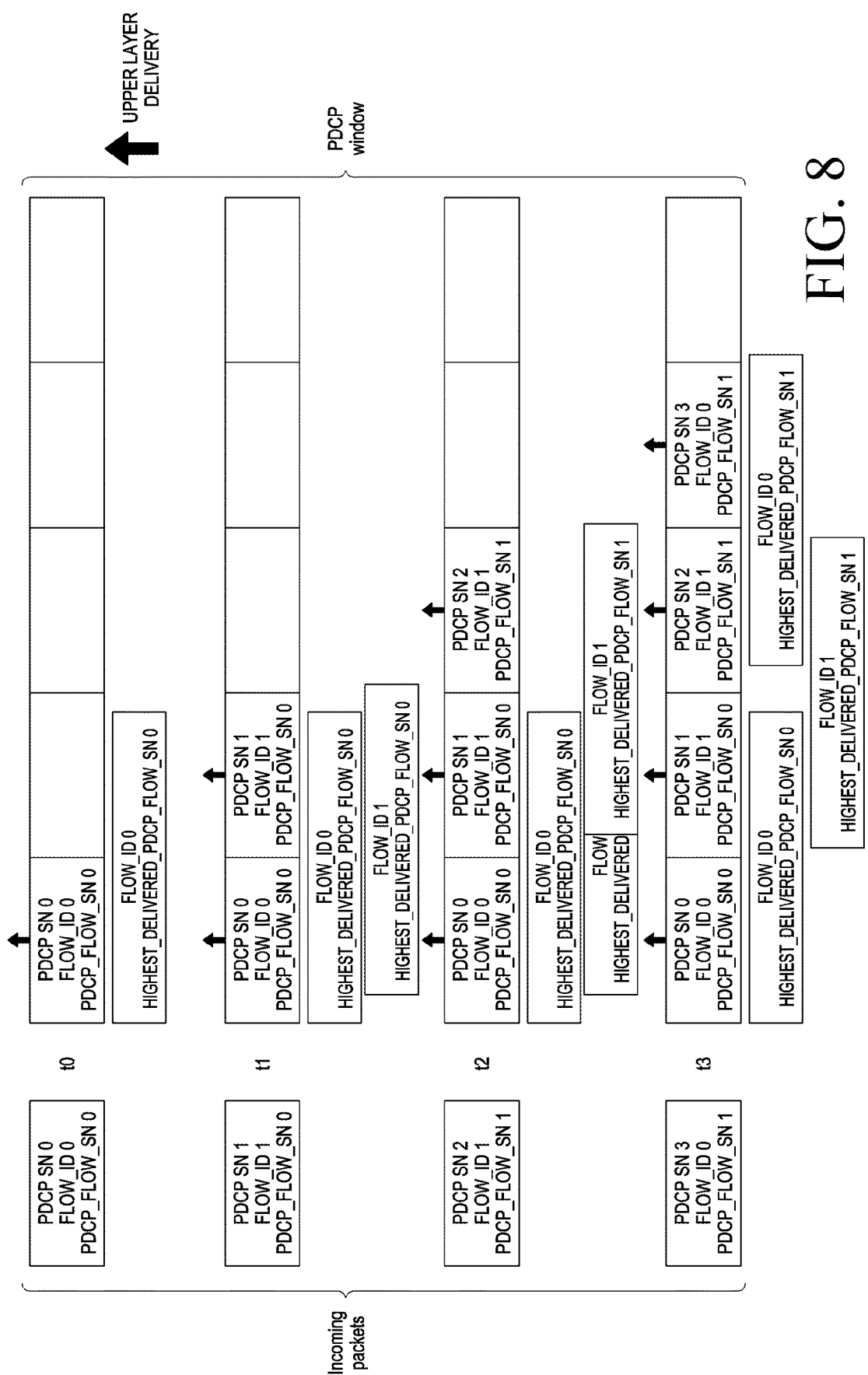
FIG. 8 is a diagram illustrating an exemplary scenario to transfer the received data packets to the upper layer where each of the received data packets is in order with respect to the corresponding flow IDs, in accordance with an example embodiment.

Now an example description will be made for explaining the method steps of FIG. 7 in detail using FIGS. 8 to 10 of the drawings. FIG. 8 is a diagram illustrating a first exemplary scenario to transfer the received data packets to the upper layer where each of the received data packets is in order with respect to the corresponding Flow IDs. As shown in FIG. 8, there are four data packets (PDCP SN 0, PDCP SN 1, PDCP SN 2, and PDCP SN 3) are received at the PDCP layer at a respective time intervals t0, t1, t2, and t3. At each of the respective time t0, t1, t2, and t3 of FIG. 8, it can be seen that none of the data packets (PDCP SN 0, PDCP SN 1, PDCP SN 2, and PDCP SN 3) is missing and each of the PDCP_FLOW_SNs (Packet flow sequence numbers) are in sequential order with respect to the corresponding Flow IDs. Therefore, each of the four data packets that are received is delivered to the upper layer. Also, it can be seen from FIG. 8 that each time a data packet is delivered to the upper layer, the highest delivered packet flow sequence number is updated. For example, when the data packet with the FLOW_ID 0 and the PDCP_FLOW_SN 0 is delivered to the upper layer, the HIGHEST_DELIVERED_PDCP_FLOW_SN of FLOW_ID 0 is updated as HIGHEST_DELIVERED_PDCP_FLOW_SN 0. Similarly, when the data packet with the FLOW_ID 1 and the PDCP_FLOW_SN 0 is delivered to the upper layer, the HIGHEST_DELIVERED_PDCP_FLOW_SN is updated as HIGHEST_DELIVERED_PDCP_FLOW_SN 0 for the FLOW_ID 1. Those skilled in the art will appreciate that the aforementioned example is exemplary.

Figure 9:
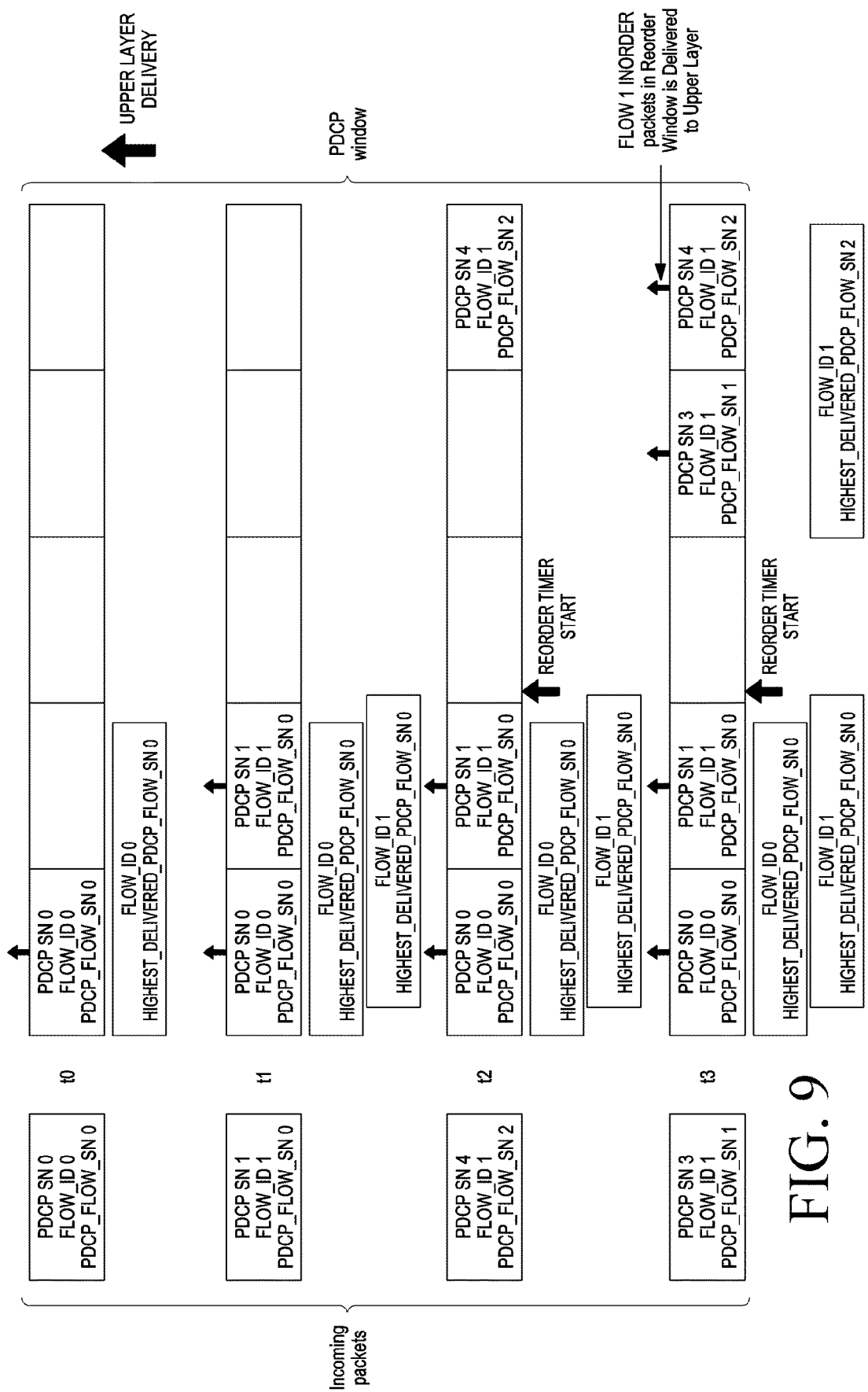
FIG. 9 is a diagram illustrating a second exemplary scenario to transfer the received data packets to the upper layer where the reorder timer is running, in accordance with an example embodiment.

FIG. 9 is a diagram illustrating a second exemplary scenario to transfer the received data packets to the upper layer where the reorder timer is running, in accordance with an embodiment. As shown in FIG. 9, there are four data packets (PDCP SN 0, PDCP SN 1, PDCP SN 4, and PDCP SN 3) are received at the PDCP layer at a respective time intervals t0, t1, t2, and t3. At time t3 of FIG. 9, it can be seen that the data packets which is received having PDCP SN 4 is out of order with respect to the sequence flow of FLOW_ID 1, and the data packet with the PDCP SN 2 and PDCP SN 3 is missing. Therefore, due to the detection of the missing data packets and the out-of-order data packets, the PDCP reorder timer starts running and waits for the missing packets to arrive at the PDCP layer. However, when the data packet with the PDCP SN 3 arrives at the PDCP layer, it is determined that the data packets with the PDCP SN 3 and the PDCP SN 4 are in order with respect to the sequence flow of FLOW_ID 1. Therefore, the data packets that are determined to be in sequence are delivered to the upper layer when the PDCP reorder timer is running. This release or transfer of the data packets in the PDCP reorder window when the reorder timer is running helps to improve the free buffer status of the communication system. Those skilled in the art will appreciate that the aforementioned example is exemplary.

Further, it can be seen from FIG. 9 that when the data packet with the PDCP SN 3 arrives at the PDCP layer and it is determined that the data packets with the PDCP SN 3 and the PDCP SN 4 are in order with respect to the sequence flow of FLOW_ID 1, the data packets with the PDCP SN 3 and the PDCP SN 4 are delivered to the upper layer. After the delivery of the data packets with the PDCP SN 3 and the PDCP SN 4 to the upper layer, the highest delivered packet flow sequence number is updated. For example, when the data packet with the FLOW_ID 1 and the PDCP_FLOW_SN 1, and the data packet with the FLOW_ID 1 and the PDCP_FLOW_SN 2 are delivered to the upper layer, then the HIGHEST_DELIVERED_PDCP_FLOW_SN of FLOW_ID 1 is updated as HIGHEST_DELIVERED_PDCP_FLOW_SN 2. Those skilled in the art will appreciate that the aforementioned example is exemplary.

According to an embodiment, the processor 602 may also determine, based on the corresponding flow IDs and the at least one packet flow sequence number of the corresponding flow IDs, the data packets among the received data packets whose packet flow sequence numbers are not in sequence with respect to the highest packet flow sequence number of flow IDs of a previously transferred data packet among the transferred data packets. Thereafter, subsequent to this determination, the processor 602 may restrict, from the PDCP to the upper layer, a transfer of the determined data packets whose packet flow sequence numbers are not in sequence with respect to the highest packet flow sequence number of flow IDs of a previously transferred data packet among the transferred data packets.

According to an embodiment, the processor 602 may also determine, based on the corresponding flow IDs and the at least one application flow sequence number of the corresponding flow IDs, the data packets among the received data packets whose application flow sequence numbers are not in sequence with respect to the highest application flow sequence number of the corresponding flow IDs. Thereafter, the processor 602 may restrict, from the PDCP to the upper layer, a transfer of the determined data packets whose application flow sequence numbers are not in sequence with respect to the highest application flow sequence number of the corresponding flow IDs.

Figure 10:
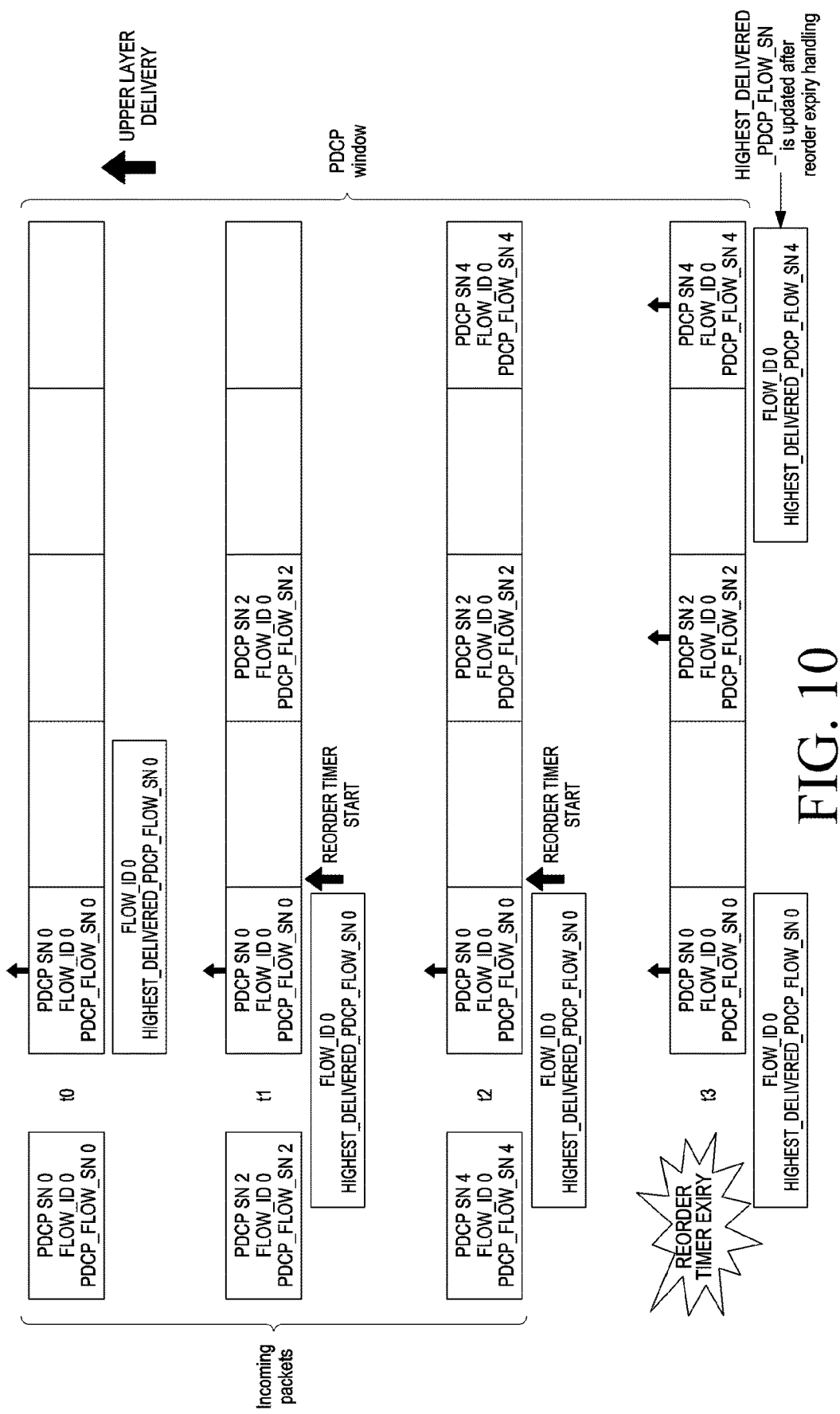
FIG. 10 is a diagram illustrating a third exemplary scenario to transfer the received data packets to the upper layer where the reorder timer is expired, in accordance with an example embodiment.

FIG. 10 is a diagram illustrating a third exemplary scenario to transfer the received data packets to the upper layer where the reorder timer is expired, in accordance with an embodiment. In accordance with the example shown in FIG. 10, each of the data packets that are out of order with respect to the sequence flow of the PDCP window indicated by the PDCP SN (packet sequence number) are delivered to the upper layer after the expiry of the PDCP reorder timer. As an example, it can be seen from FIG. 10 that when the data packet with the PDCP SN 4 arrives at the PDCP layer and it is determined that the data packets with the PDCP SN 2 and the PDCP SN 4 are out of order with respect to the sequence flow of the PDCP window indicated by the PDCP SN, then the data packets with the PDCP SN 2 and the PDCP SN 4 are delivered to the upper layer after the expiry of the PDCP reorder timer. After the delivery of the data packets with the PDCP SN 2 and the PDCP SN 4 to the upper layer, the highest delivered packet flow sequence number is updated. For example, when the data packet with the FLOW_ID 0 and the PDCP_FLOW_SN 2, and the data packet with the FLOW_ID 0 and the PDCP_FLOW_SN 4 are delivered to the upper layer, then the HIGHEST_DELIVERED_PDCP_FLOW_SN of FLOW_ID 0 is updated as HIGHEST_DELIVERED_PDCP_FLOW_SN 4. Those skilled in the art will appreciate that the aforementioned example as shown in FIG. 10 is exemplary.

According to an embodiment, in particular, the processor 602 transfers, to the upper layer after an expiry of the reorder timer, the identified at least one data packet that is out of order with respect to the corresponding flow IDs. Thereafter, the processor 602 also updates, after the expiry of the reorder timer, the at least one packet flow sequence number of the corresponding flow IDs each time when the corresponding data packet of the received plurality of data packets is transferred from the PDCP layer to the upper layer. Similarly, the processor 602 may also update, after the expiry of the reorder timer, the application flow sequence number of the corresponding flow IDs each time when the corresponding data packet of the received plurality of data packets is transferred from the PDCP layer to the upper layer.

Figure 11:
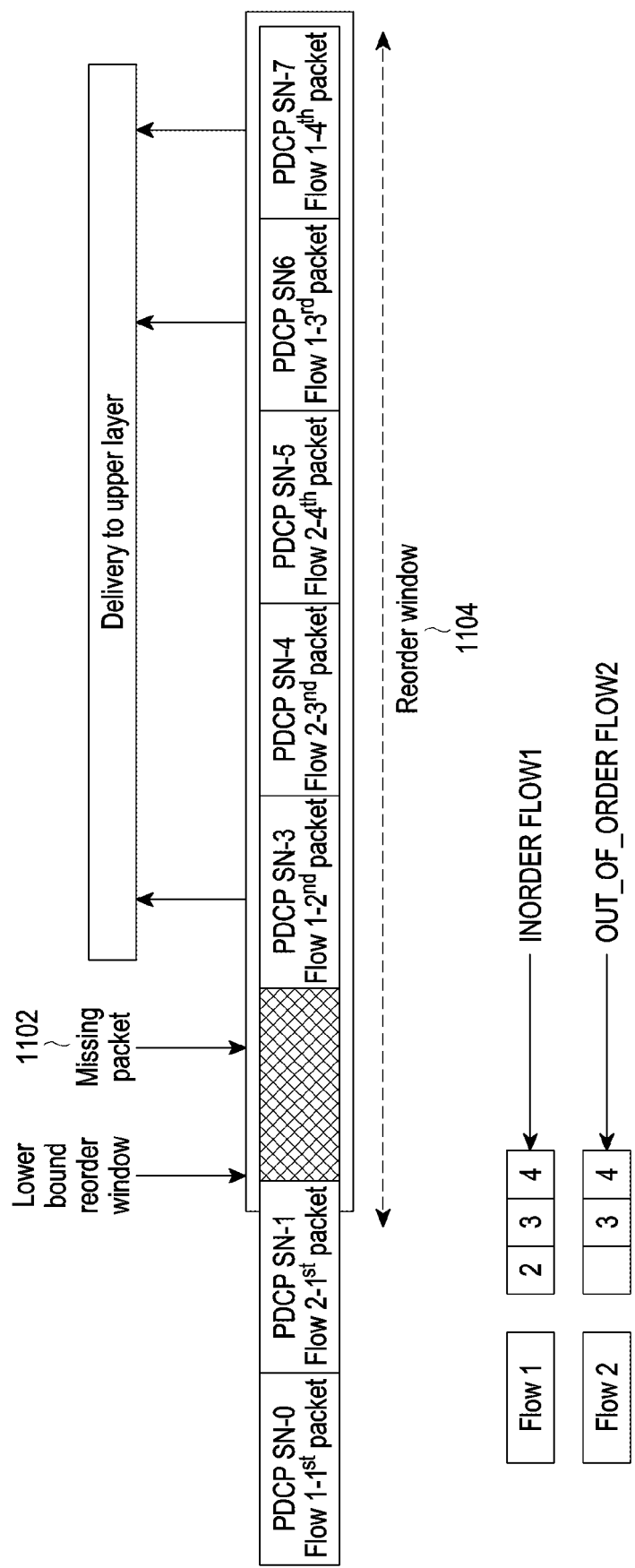
FIG. 11 is a diagram illustrating a working example of the method described in FIG. 7, in accordance with an example embodiment.

Now a brief description of the method 700 will be described with reference to FIG. 11 and FIGS. 12 and 13. FIG. 11 is a diagram illustrating a working example of the method described in FIG. 7, in accordance with an embodiment.

According to the example shown in FIG. 11, it can be seen that there are two flow IDs e.g., Flow1 and Flow2 that are present in the data packets received in the reordering window. There are multiple PDCP sequence numbers (PDCP SN-0, PDCP SN-1, PDCP SN-7 as shown in the reorder window 1104) associated with the received packets. Further, as an example as per the FIG. 11, when it is detected by the processor 602 that the data packet of Flow2 with the PDCP SN-2 is missing (missing packet 1102) and the reorder timer is started, thereafter the processor 602 checks for the data packets of the other flow (Flow1) to determine whether the data packets of the flow other than the flow with the missing packet are in order or not with respect to the corresponding sequence flows of the reorder window 1104. When it is determined that the data packets of the flow other than the flow with the missing packet are in order, then the processor 602 transfers all the packets that are in order, to the upper layer in the RAN protocol stack. Whereas the received data packets which are not in order with respect to the corresponding sequence flows of the reordering window are transferred to the upper layer after an expiry of the reorder timer. Those skilled in the art will appreciate that the aforementioned example is exemplary.

Figure 12:
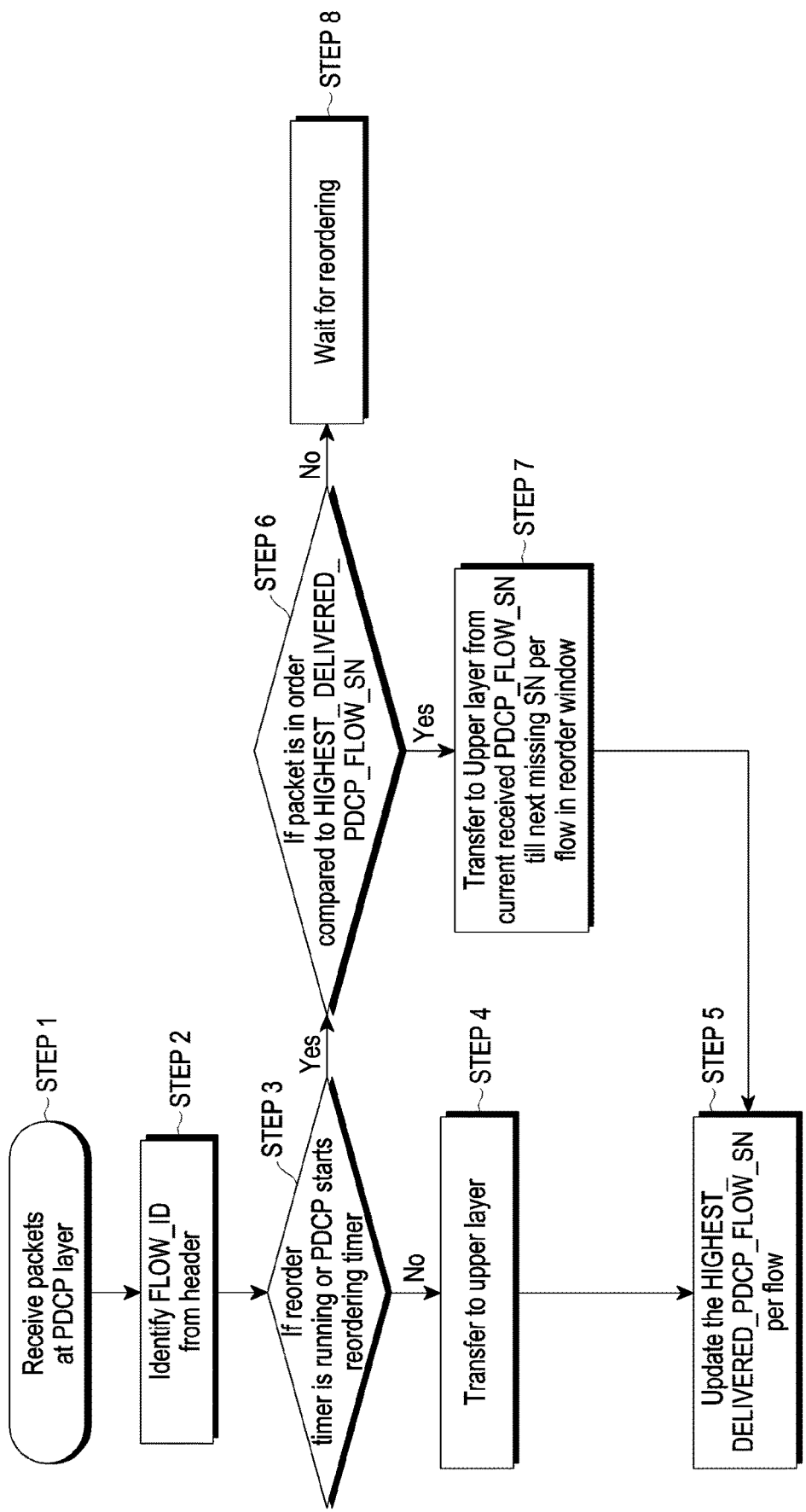
FIG. 12 illustrates a first detailed flow diagram representing the method for management of the data flow at the receiver, in accordance with an example embodiment.

FIG. 12 is a first detailed flow diagram representing the method for management of the data flow at the receiver, in accordance with an embodiment. The functionalities and the operation which are similar to that of the operations of the method 700 as described above are omitted herein for the shake of simplicity and brevity.

Step 1 of FIG. 12, illustrates the reception of the data packets at the PDCP layer as described in step 702 of FIG. 7 of the drawings. As an example, Step 2 of FIG. 12, illustrates the identification of the Flow IDs of the received data packets by the processor 602 based on the header information as described above.

Step 3 of FIG. 12, illustrates a determination operation by the processor 602 to determine whether the reorder timer of the PDCP layer is running or the PDCP starts the reordering timer in accordance with the step 706 of the method 700 as described above. When it is determined that a result of the determination at step 3 is yes, then the process flow proceeds to step 6 of FIG. 12.

In step 6 of FIG. 12, the processor 602 performs a determination to check whether a currently received data packet is in order with the highest delivered packet flow sequence number (HIGHEST_DELIVERED_PDCP_FLOW_SN). If a result of the determination operation of step 6 is No, then at step 8, the processor 602 waits for the reorder timer to expire for delivery of the currently received data packet to the upper layer. And if the result of the determination operation of step 6 is Yes, then the processor 602 proceeds to the step 7 of FIG. 12, where the processor 602 transfers, to the upper layer, all the received data packets from the currently received data packet till the next missing packet sequence number (PDCP_SN) per-flow in the reorder window.

Further, when it is determined that the result of the determination at step 3 is No, then the process flow proceeds to step 4 of FIG. 12, where the processor 602 transfer all the data packets that are in order with respect to the corresponding flow IDs to the upper layer. Each time when the data packets are transferred from the PDCP layer to the upper layer, at step 5 of FIG. 12, the processor 602 updates the highest packet flow sequence number of the corresponding flow IDs of the data packets that are transferred from the PDCP to the upper layer.

Figure 13:
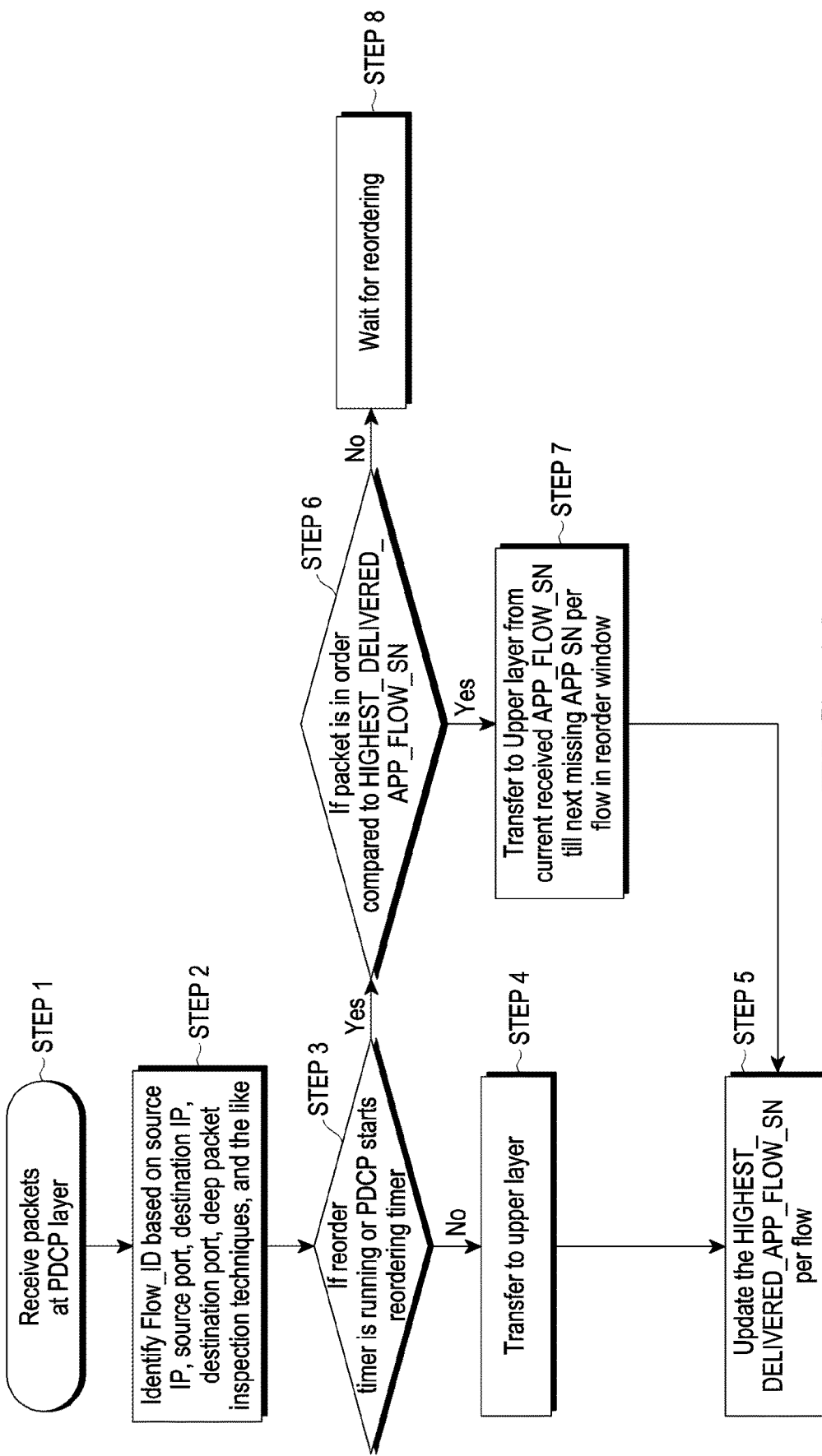
FIG. 13 is a second detailed flow diagram representing the method for management of the data flow at the receiver, in accordance with an example embodiment.

FIG. 13 is a second detailed flow diagram representing the method for management of the data flow at the receiver, in accordance with an embodiment. The functionalities and the operation which are similar to that of the operations of the method 700 and FIG. 12 as described above are omitted herein for the shake of simplicity and brevity.

Step 1 of FIG. 13, illustrates the reception of the data packets at the PDCP layer as described in step 702 of FIG. 7 of the drawings.

Step 2 of FIG. 13, illustrates the identification of the Flow IDs of the received data packets by the processor 602 based on a plurality of parameters related to each of the received data packets which correspond to but are not necessarily limited to including, a source IP, a destination IP, a source port, and a destination port of the corresponding data packet of the received data packets. Those skilled in the art will appreciate that the aforementioned parameters are exemplary and are not intended to limit the scope of the invention. The processor 602 may also identify the Flow IDs based on a deep packet inspection method, and the like.

Step 3 of FIG. 13 is similar to that of step 3 of FIG. 12 and therefore is omitted herein. In step 6 of FIG. 13, the processor 602 performs a determination to check whether a currently received data packet is in order with the highest delivered application flow sequence number (HIGHEST_DELIVERED_APP_FLOW_SN). If a result of the determination operation of step 6 is No, then at step 8, the processor 602 waits for the reorder timer to expire for delivery of the currently received data packet to the upper layer. And if the result of the determination operation of step 6 of FIG. 13 is Yes, then the processor 602 proceeds to the step 7 of FIG. 13, where the processor 602 transfers, to the upper layer, all the received data packets from the currently received data packet till the next missing application flow sequence number (APP_FLOW_SN) per-flow in the reorder window.

Further, when it is determined that the result of the determination at step 3 of FIG. 13 is No, then the process flow proceeds to step 4 of FIG. 13, where the processor 602 transfer all the data packets that are in order with respect to the corresponding flow IDs to the upper layer. Each time when the data packets are transferred from the PDCP layer to the upper layer, at step 5 of FIG. 13, the processor 602 updates the highest delivered application flow sequence number of the corresponding flow IDs of the data packets that are transferred from the PDCP to the upper layer.

Figure 14:
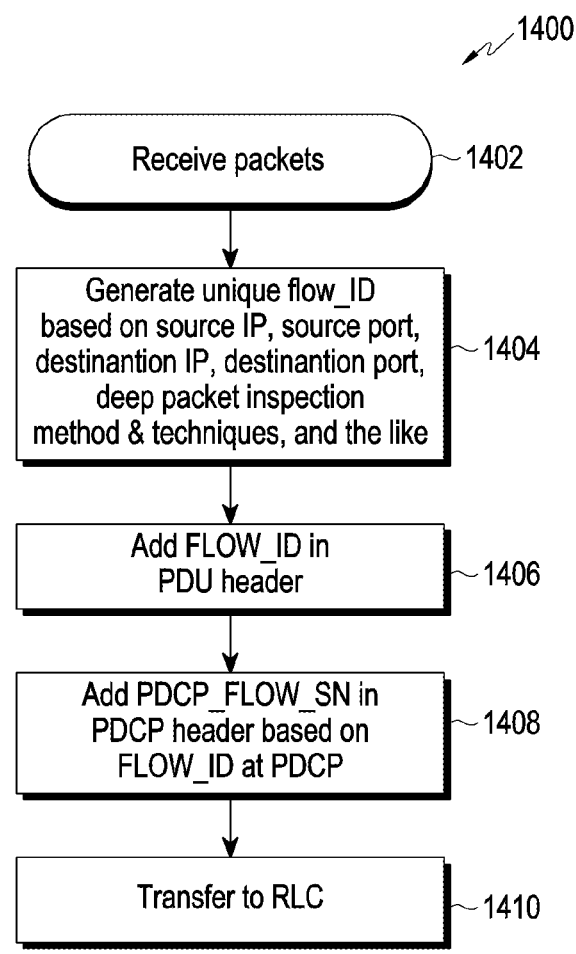
FIG. 14 is a flow chart of method steps for management of data flow at a transmitter, in accordance with an example embodiment.

Now a flow chart of method steps for management of the data flow at the transmitter 604B will be described with reference to FIG. 14 of the Drawings. FIG. 14 is a flow chart of method steps for management of data flow at the transmitter 604B, in accordance with an embodiment.

The method 1400 comprises receiving (at step 1402), at the PDCP layer, one or more data packets in a bit sequence from an upper layer. As an example, the bit sequence corresponds to the PDU. The flow of the method 1400 now proceeds to (step 1404).

At the step 1404, the method 1400 comprises generating unique Flow IDs of the received data packets based on the plurality of parameters related to each of the received data packets which correspond to but are not necessarily limited to including, a source IP, a destination IP, a source port, and a destination port of the corresponding data packet of the received data packets. For generating the unique Flow IDs, at first, the processor 602 analyzes a sequence flow of the received one or more data packets based on the packet sequence numbers (PDCP SN) included in the PDU header of each of the one or more data packets. Then, after the analysis, the processor 602 assigns a flow ID to each of the one or more data packets based on the result of the analysis and the plurality of parameters as described above. Thereafter, as an outcome of assigning the Flow_ID to each of the one or more data packets, the unique flow IDs are generated. The Same FLOW_ID is generated for all the packets that are belonging to the same flow. It is to be noted that The Identification and the assigning operation to assign the unique FLOW_ID to each of the one or more data packets, can be done by any layer before the PDCP SN update.

According to an embodiment, the processor 602 may assign a set of flow IDs to a set of data packets among the one or more received data packets. The set of data packets to which the set of flow IDs is assigned have the at least one of the source IP, destination IP, source port, or destination port in common. Here, a same flow ID has been assigned to the data packets belonging to a same flow. The flow of the method 1400 now proceeds to (step 1406).

At step 1406, the method 1400 comprises adding a corresponding flow ID among the assigned flow IDs to the PDU header of a corresponding data packet of the one or more data packets. As an example, the processor 602 adds the corresponding flow ID among the assigned flow IDs to the PDU header of the corresponding received data packets. The flow of the method 1400 now proceeds to (step 1408).

At the step 1408, the method 1400 comprises adding, in an ascending order of the packet sequence numbers of the one or more data packets, at least one packet flow sequence number to each of the corresponding flow ID among the assigned flow IDs in a corresponding PDCP Header of the corresponding data packet of the one or more of data packets. As an example, the processor 602 adds PDCP_FLOW_SN in PDCP Header based on FLOW_ID on incrementing basis. Further, the processor 602 also updates the at least one packet flow sequence number (PDCP_FLOW_SN) of the corresponding flow IDs each time when a new packet flow sequence number is added to any of the corresponding flow IDs among the assigned flow IDs. As an example, the processor 602 updates the PDCP_FLOW_SN_TX_NEXT each time when the new packet flow sequence number is added to any of the corresponding flow IDs. In particular, the PDCP_FLOW_SN_TX_NEXT is maintained per FLOW_ID at the PDCP layer. The updated packet flow sequence number corresponds to a packet flow sequence number that is to be added subsequently after a previous packet flow sequence number in the corresponding flow ID. The aforesaid described at least one packet flow sequence number is initialized from a specific value for each of the corresponding flow IDs among the assigned flow IDs. The flow of the method 1400 now proceeds to (step 1410).

At the step 1410, the method 1400 comprises transferring, to a Radio link control (RLC) layer, the one or more data packets after the addition of the assigned flow IDs and the addition of the at least one packet flow sequence number to each of the corresponding flow ID among the assigned flow IDs. As an example, the processor 602 sends or transfers the data packets to the RLC layer after adding the PDCP_FLOW_SN to each of the assigned Flow IDs. The PDCP_FLOW_SN can be of but is not limited to 12 bits or 18 bits based on PDCP SN length.

Figure 15A:
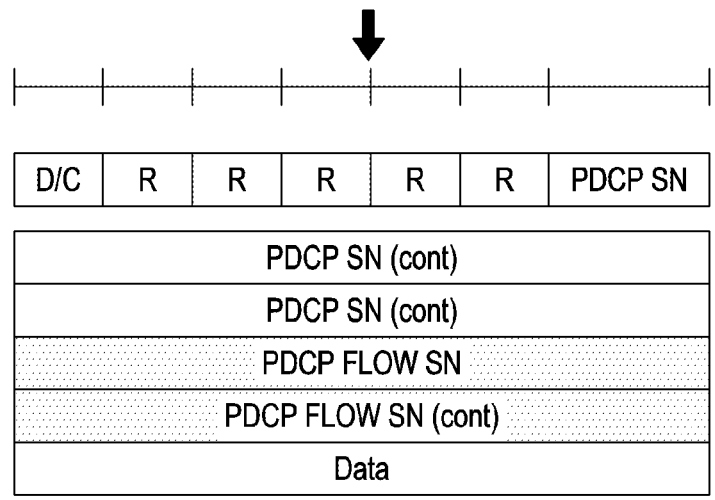
FIG. 15A is a diagram illustrating a PDCP Header PDU format for adding the per-flow SN, in accordance with an example embodiment.

Now an example description of the PDCP Header PDU format for adding the per-flow SN will be described with reference to FIG. 15A of the drawings. FIG. 15A is a diagram illustrating a PDCP Header PDU format for adding the per-flow SN, in accordance with an embodiment. FIG. 15A depicts a PDCP Header PDU format 1500A for adding per-flow SN. The PDCP Header PDU format 1500A structure includes a D/C(Data/Control Bit), a PDCP SN, a PDCP_FLOW_SN, and other data. Where the Data/Control Bit denotes the control bit for the PDU, the PDCP SN denotes the PDCP sequence number, and the PDCP_FLOW_SN denotes the per-flow PDCP packet flow sequence number.

Figure 15B:
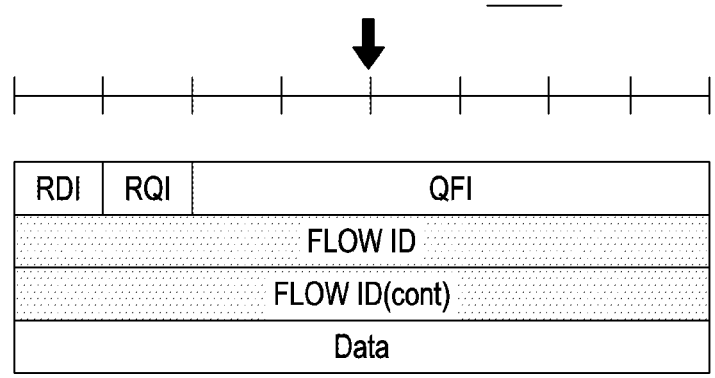
FIG. 15B is a diagram illustrating an SDAP Header PDU format 1500B to be used when the flow identification is performed in the SDAP Layer in accordance with an example embodiment.

Referring now to FIG. 15B is a diagram illustrating an SDAP Header PDU format 1500B to be used when the flow identification is performed in the SDAP Layer in accordance with an embodiment. FIG. 15B depicts the SDAP Header PDU format 1500B. The structure of the SDAP Header PDU format 1500B includes an RDI, an RQI, a QFI, a FLOW_ID, and other data. Where the RDI corresponds to Reflective QoS Flow to DRB mapping indication, the RQI corresponds to Reflective QoS Indication, the QFI corresponds to QoS Flow Identifier, and the FLOW_ID corresponds to the Flow identifier that is generated based on but not limited to including, Source IP, Source Port, Destination IP, Destination Port and Deep packet section techniques, and the like.

Figure 16:
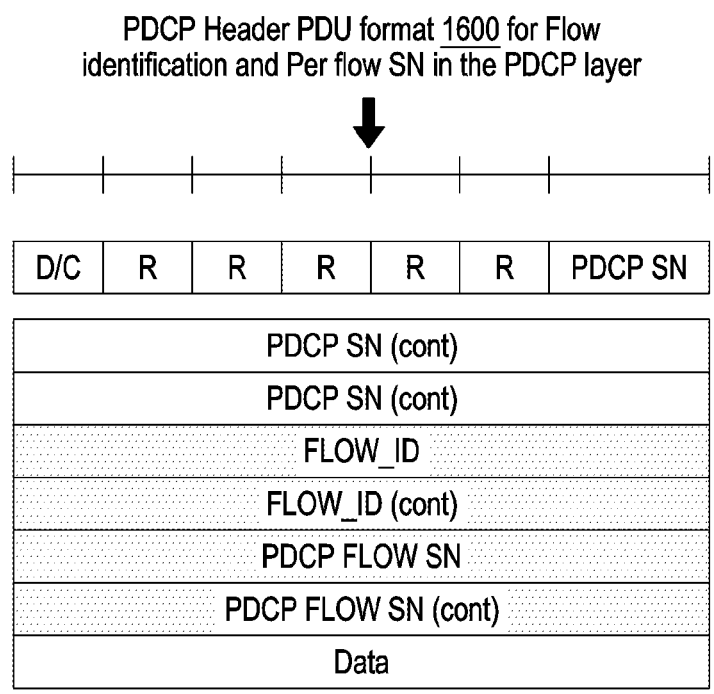
FIG. 16 is a diagram illustrating a PDCP Header PDU format 1600 for the Flow identification and Per-flow SN in the PDCP layer, in accordance with an example embodiment.

Referring now to FIG. 16 is a diagram illustrating a PDCP Header PDU format 1600 for the Flow identification and Per-flow SN in the PDCP layer, in accordance with an embodiment. The structure of the PDCP Header PDU format 1600 includes a D/C (Data/Control Bit), a PDCP SN, a FLOW ID, a PDCP_FLOW_SN, and other data. Where the Data/Control Bit denotes the control bit for the PDU, the PDCP SN denotes the PDCP sequence number, the FLOW ID corresponds to the Flow identifier that is generated based on, but not limited to including Source IP, Source Port, Destination IP, Destination Port, and Deep packet section techniques, and the like, and the PDCP_FLOW_SN denotes per-flow PDCP packet flow sequence number.

According to an example method and the communication system, the in-order data packets can be identified and delivered with respect to individual flows from the reorder window of the PDCP layer to the upper layer. This can significantly help in improving user experience with higher throughput, avoiding triggering error recovery and flow control mechanism at the application or transport layer, and avoiding incorrect RTT estimations.

The method and system can help to segregate the packet loss between the server to the PDCP and the PDCP to the UE.

In a hardware configuration, the method and the communication system according to the embodiments may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method and the communication system according to the embodiments may be implemented in the form of modules, procedures, functions, etc. performing the above-described functions or operations. Instructions may be stored in a memory unit (including a memory) and executed by a processor (including processing circuitry). The memory unit may be located at the interior or exterior of the processor and may transmit and receive data to and from the processor via various known means.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Those skilled in the art will appreciate that the operations described herein in the present disclosure may be carried out in other specific ways than those set forth herein without departing from essential characteristics. The above-described embodiments are therefore to be construed in all aspects as illustrative and not restrictive. The scope of the invention should be determined by the appended claims, not by the above description, and all changes coming within the meaning of the appended claims are intended to be embraced therein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for management of data flow at a receiver, the method comprising:
   receiving, in a reordering window of a Packet Data Convergence Protocol (PDCP) layer, a plurality of data packets each including header information, the plurality of data packets including data packets belonging to a plurality of packet flows corresponding to a different application;
   determining, based on the header information, packet sequence numbers of the received plurality of data packets, flow identifiers (IDs) each of which corresponds to one of the plurality of packet flows and is associated with a corresponding data packet of the received plurality of data packets, and at least one packet flow sequence number of each of the flow IDs;
   determining that at least one data packet in the received plurality of data packets is out of order in a first flow with a first flow ID of the plurality of packet flows, based on at least one of the packet sequence numbers of the received plurality of data packets and a packet flow sequence number of the first flow;
   starting a reorder timer of the PDCP layer based on determining that the at least one data packet is out of order in the first flow;
   determining, based on the determined flow IDs and the at least one packet flow sequence number of each of the determined flow IDs, a first set of data packets among the received plurality of data packets of which associated packet flow sequence numbers are in order in a second flow with a second flow ID of the plurality of packet flows;
   transferring at least one data packet in the received plurality of data packets that is in order in the first flow of the plurality of packet flows with the first flow ID and the determined first set of data packets to an upper layer based on determining that the reorder timer of the PDCP layer is running;
   transferring, to the upper layer after transferring the determined first set of data packets and an expiry of the reorder timer, the at least one data packet whose packet flow sequence number is out of order in the first flow;
   determining, based on the determined flow IDs and the at least one packet flow sequence number of the flow IDs, a second set of data packets among the received plurality of data packets of which packet flow sequence numbers are not in sequence with respect to a highest packet flow sequence number of flow IDs of a previously transferred data packet among the transferred first set of data packets; and
   restricting a transfer of the determined second set of data packets from the PDCP to the upper layer.

2. The method of claim 1, further comprising:
   updating, when the reorder timer of the PDCP layer is running, packet flow sequence number of flow IDs of the first set of data packets each time after a transfer of the data packets from the PDCP layer to the upper layer.

3. The method of claim 2, further comprising updating, when the reorder timer of the PDCP layer is not running, the at least one packet flow sequence number of the flow IDs each time when the corresponding data packet of the received plurality of data packets is transferred from the PDCP layer to the upper layer.

4. The method of claim 2, further comprising:
   transferring, to the upper layer when the reorder timer of the PDCP layer is running, each of data packets that are in sequence with respect to corresponding flow IDs; and
   updating, when the reorder timer of the PDCP layer is running, packet flow sequence numbers of the corresponding flow IDs each time when the data packets are transferred from the PDCP layer to the upper layer.

5. The method of claim 2, further comprising updating, after the expiry of the reorder timer, the at least one packet flow sequence number of the flow IDs each time when the corresponding data packet of the received plurality of data packets is transferred from the PDCP layer to the upper layer.

6. The method of claim 5, wherein the updated packet flow sequence number is a highest packet flow sequence number among packet flow sequence numbers of the data packets of the corresponding flow IDs that are previously transferred from the PDCP layer to the upper layer.

7. The method of claim 1, wherein
the header information of each of the received plurality of data packets corresponds to information included in a Packet Data Unit (PDU) header and one of a Service Data Adaptation Protocol (SDAP) header or a PDCP header of corresponding data packet of the received plurality of data packets,
the information included in the PDU header indicates flow ID of the corresponding data packet of the received plurality of data packets, and
the information included in one of the SDAP header or the PDCP header indicates the packet flow sequence numbers of each of the flow IDs.

8. A method for management of data flow at a receiver in a communication network, the method comprising:
receiving, in a reordering window of a Packet Data Convergence Protocol (PDCP) layer, a plurality of data packets associated with a plurality of applications, wherein each of the received plurality of data packets includes application header information, the plurality of data packets including data packets belonging to a plurality of packet flows corresponding to a different application;
generating flow identifiers (IDs) of the received plurality of data packets based on the application header information, wherein each of the generated flows IDs corresponds to one of the plurality of packet flows and corresponds to a corresponding data packet of the received plurality of data packets;
determining, based on packet sequence numbers of the received plurality of data packets and the generated flow IDs, application flow sequence numbers of each of the generated flow IDs;
determining that at least one data packet in the received plurality of data packets is out of order in a first flow with a first flow ID of the plurality of packet flows, based on at least one of the packet sequence numbers of the received plurality of data packets and a packet flow sequence number of the first flow;
starting a reorder timer of the PDCP layer based on determining that the at least one data packet is out of order in the first flow;
determining, based on the generated flow IDs and the application flow sequence numbers of each of the generated flow IDs, a first set of data packets among the received plurality of data packets of which associated application flow sequence numbers are in sequence in a second flow with a second flow ID of the plurality of packet flows;
transferring one or more data packets in the received plurality of data packets that is in order in the first flow of the plurality of packet flows with the first flow ID and the determined first set of data packets to an upper layer based on determining that the reorder timer of the PDCP layer is running;
transferring, to the upper layer after transferring the determined first set of data packets and an expiry of the reorder timer, the at least one data packet whose packet flow sequence number is out of order in the first flow;
determining, based on the determined flow IDs and the at least one packet flow sequence number of the flow IDs, a second set of data packets among the received plurality of data packets of which packet flow sequence numbers are not in sequence with respect to a highest packet flow sequence number of flow IDs of a previously transferred data packet among the transferred first set of data packets; and
restricting a transfer of the determined second set of data packets from the PDCP to the upper layer.

9. The method of claim 8, further comprising:
updating, when the reorder timer of the PDCP layer is running, the application flow sequence number of flow IDs of the first set of data packets each time after a transfer of the data packets from the PDCP layer to the upper layer.

10. The method of claim 9, further comprising:
transferring, to the upper layer when the reorder timer of the PDCP layer is running or started, each of data packets that are in sequence with respect to corresponding flow IDs and the application sequence flow of the corresponding flow IDs; and
updating, when the reorder timer of the PDCP layer is running, application flow sequence numbers of the corresponding flow IDs each time when the data packets are transferred from the PDCP layer to the upper layer.

11. The method of claim 9, further comprising updating, after the expiry of the reorder timer, the application flow sequence number of the flow IDs each time when the corresponding data packet of the received plurality of data packets is transferred from the PDCP layer to the upper layer.

12. The method of claim 11, wherein the updated application flow sequence number is a highest application flow sequence number among application flow sequence numbers of the corresponding flow IDs that are previously transferred from the PDCP layer to the upper layer.

13. The method of claim 8, further comprising updating, when the reorder timer of the PDCP layer is not running, the application flow sequence number of the flow IDs each time when the corresponding data packet of the received plurality of data packets is transferred from the PDCP layer to the upper layer.

14. The method of claim 8, wherein the application header information of each of the received plurality of data packets corresponds to transport protocol information present in the corresponding data packet of the received plurality of data packets.

15. A receiver for management of data flow in a communication network, the receiver comprising:
a memory; and
at least one processor comprising processing circuitry coupled to the memory, wherein the at least one processor is individually and/or collectively configured to:
receive, in a reordering window of a Packet Data Convergence Protocol (PDCP) layer, a plurality of data packets each including header information, the plurality of data packets including data packets belonging to a plurality of packet flows corresponding to a different application,
determine, based on the header information, packet sequence numbers of the received plurality of data packets, flow identifiers (IDs) each of which corresponds to one of the plurality of packet flows and is associated with a corresponding data packet of the received plurality of data packets, and at least one packet flow sequence number of each of the flow IDs, determine that at least one data packet in the received plurality is out of order in a first flow with a first flow ID of the plurality of packet flows, based on at least one of the packet sequence numbers of the received plurality of data packets and a packet flow sequence number of the first flow, start a reorder timer of the PDCP layer based on determining that the packet flow sequence number of the at least one data packet whose packet flow sequence number is out of order in the first flow, determine, based on the determined flow IDs and the at least one packet flow sequence number of each of the determined flow IDs, a first set of data packets among the received plurality of data packets of which associated packet flow sequence numbers of are in order in a second flow with a second flow ID of the plurality of packet flows, transfer one or more data packets in the received plurality of data packets that is in order in the first flow of the plurality of packet flows with the first flow ID and the determined first set of data packets to an upper layer based on determining that the reorder timer of the PDCP layer is running, transfer, to the upper layer after transferring the determined first set of data packets and an expiry of the reorder timer, the at least one data packet whose packet flow sequence number is out of order in the first flow, determine, based on the determined flow IDs and the at least one packet flow sequence number of the flow IDs, a second set of data packets among the received plurality of data packets of which packet flow sequence numbers are not in sequence with respect to a highest packet flow sequence number of flow IDs of a previously transferred data packet among the transferred first set of data packets, and restrict a transfer of the determined second set of data packets from the PDCP to the upper layer.

16. The receiver of claim 15, wherein the at least one processor is further configured to:

update, when the reorder timer of the PDCP layer is running, packet flow sequence number of flow IDs of the first set of data packets each time after a transfer of the data packets from the PDCP layer to the upper layer.

17. A receiver for management of data flow in a communication network, the receiver comprising:

a memory; and at least one processor comprising processing circuitry coupled to the memory, wherein the at least one processor is individually and/or collectively configured to:

receive, in a reordering window of a Packet Data Convergence Protocol (PDCP) layer, a plurality of data packets associated with a plurality of applications from a transmitter, wherein each of the received plurality of data packets includes application header information, the plurality of data packets including data packets belonging to a plurality of packet flows corresponding to a different application;

generate flow identifiers (IDs) of the received plurality of data packets based on the application header information, wherein each of the flows IDs corresponds to one of the plurality of packet flows and corresponds to a corresponding data packet of the received plurality of data packets;

determine, based on packet sequence numbers of the received plurality of data packets and the generated flow IDs, application flow sequence numbers of each of the flow IDs;

determine that at least one data packet in the received plurality of data packets is out of order in a first flow with a first flow ID of the plurality of packet flows, based on at least one of the packet sequence numbers of the received plurality of data packets and a packet flow sequence number of the first flow;

start a reorder timer of the PDCP layer based on determining that the at least one data packet is out of order in the first flow;

determine, based on the generated flow IDs and the application flow sequence numbers of each of the generated flow IDs, a first set of data packets among the received plurality of data packets of which associated application flow sequence numbers are in sequence in a second flow with a second flow ID of the plurality of packet flows;

transfer one or more data packet in the received plurality of data packets that is in order in the first flow of the plurality of packet flows with the first flow ID and the determined first set of data packets to an upper layer based on determining that the reorder timer of the PDCP layer is running;

transfer, to the upper layer after transferring the determined first set of data packets and an expiry of the reorder timer, the at least one data packet whose packet flow sequence number is out of order in the first flow;

determine, based on the determined flow IDs and the at least one packet flow sequence number of the flow IDs, a second set of data packets among the received plurality of data packets of which packet flow sequence numbers are not in sequence with respect to a highest packet flow sequence number of flow IDs of a previously transferred data packet among the transferred first set of data packets; and restrict a transfer of the determined second set of data packets from the PDCP to the upper layer.

18. The receiver of claim 17, wherein the at least one processor is further configured to:

update, when the reorder timer of the PDCP layer is running, the application flow sequence number of flow IDs of the first set of data packets each time after a transfer of the data packets from the PDCP layer to the upper layer.

* * * * *